(12) United States Patent
Starostenko et al.

(10) Patent No.: US 11,631,092 B2
(45) Date of Patent: Apr. 18, 2023

(54) METHODS AND APPARATUS FOR MAINTAINING AND/OR UPDATING ONE OR MORE ITEM TAXONOMIES

(71) Applicant: SHOPIFY INC., Ottawa (CA)

(72) Inventors: Julia Starostenko, Berlin (DE); Rafael Seemann Ramos, Berlin (DE)

(73) Assignee: SHOPIFY INC., Ottawa (CA)

( * ) Notice: Subject to any disclaimer, the term of this patent is extended or adjusted under 35 U.S.C. 154(b) by 30 days.

(21) Appl. No.: 17/082,469

(22) Filed: Oct. 28, 2020

(65) Prior Publication Data
US 2022/0129920 A1 Apr. 28, 2022

(51) Int. Cl.
| | | |
|---|---|---|
| *G06Q 30/0201* | (2023.01) | |
| *G06Q 30/0601* | (2023.01) | |
| *G06Q 30/0204* | (2023.01) | |
| *G06Q 10/10* | (2023.01) | |
| *G06F 16/28* | (2019.01) | |
| *G06N 20/00* | (2019.01) | |
| *G06F 3/0482* | (2013.01) | |
| *G06F 16/9535* | (2019.01) | |
| *H04L 67/50* | (2022.01) | |

(52) U.S. Cl.
CPC ........ *G06Q 30/0201* (2013.01); *G06F 3/0482* (2013.01); *G06F 16/287* (2019.01); *G06F 16/9535* (2019.01); *G06N 20/00* (2019.01); *G06Q 10/10* (2013.01); *G06Q 30/0204* (2013.01); *G06Q 30/0633* (2013.01); *H04L 67/535* (2022.05); *G06Q 30/0625* (2013.01)

(58) Field of Classification Search
None
See application file for complete search history.

(56) References Cited

U.S. PATENT DOCUMENTS

| | | | | |
|---|---|---|---|---|
| 9,613,371 | B2* | 4/2017 | Subramanya | G06Q 30/0623 |
| 2015/0046300 | A1* | 2/2015 | Menipaz | G06F 16/285 |
| | | | | 705/28 |
| 2017/0177703 | A1* | 6/2017 | Liu | G06F 16/285 |
| 2019/0286740 | A1* | 9/2019 | Menipaz | G06F 16/248 |
| 2020/0334734 | A1* | 10/2020 | Al Jadda | G06F 16/9535 |
| 2021/0073887 | A1* | 3/2021 | Boo | B33Y 50/00 |

FOREIGN PATENT DOCUMENTS

WO  WO-2017223547 A1 * 12/2017 ......... G06Q 30/0242

OTHER PUBLICATIONS

Sacco, Research Results in Dynamic Taxonomy and Faceted Search Systems (Year: 2007).*

* cited by examiner

*Primary Examiner* — Mohamed N El-Bathy
(74) *Attorney, Agent, or Firm* — Foley & Lardner LLP

(57) ABSTRACT

Methods and apparatus relating to the generation, management and use of taxonomies are described. Over time statistics are collected based on the user interaction and the effectiveness of the taxonomy determined with respect to one or more groups of users. Decisions are automatically made when a new e.g., custom, taxonomy is to be generated for a set of users. Over time multiple custom taxonomies are generated for different user groups with each group of users being provided access to items through the taxonomy which provides the best results for the group. Generated taxonomies are compared and merged or combined when similar to avoid the generation and maintenance of a large number of similar taxonomies.

20 Claims, 11 Drawing Sheets

METHODS AND APPARATUS FOR MAINTAINING AND/OR UPDATING ONE OR MORE ITEM TAXONOMIES

FIELD

The present application relates to user interfaces and, more particularly, to constructing or maintaining taxonomies used to support customer access to items, and, yet more particularly, to methods and apparatus for updating, using and/or revising one or more taxonomies used to list or present items.

BACKGROUND

User interfaces are important for supporting efficient interaction with users, e.g., customers, merchants, providers, and suppliers. The arrangement of items to provide efficient access to the items can be an important part of a user interface.

To enable user access to items there is often a need to organize items, sometimes referred to as objects or products, into categories, for example, to ease browsing, discoverability, aggregated analysis, etc. Such organization and presentation of items to a user, can be, and often is, implemented using what is referred to as a taxonomy.

One application where a taxonomy is particularly useful is in e-commerce. In the case of an e-commerce platform, items that have been organized into categories are often arranged into a taxonomy to facilitate access by users of the e-commerce platform. While taxonomies are useful for e-commerce, they are also used to organize items for other applications. In the case of a website, e-commerce application or other use, a taxonomy can be, and often is, an important part of the user interface which can affect the usefulness of a web site or application using the taxonomy.

BRIEF DESCRIPTION OF THE FIGURES

FIGS. 2A, 2B, 2C and 2D are to be combined to form a complete exemplary flowchart showing the steps implemented in accordance with one exemplary embodiment.

SUMMARY

Figure 1:
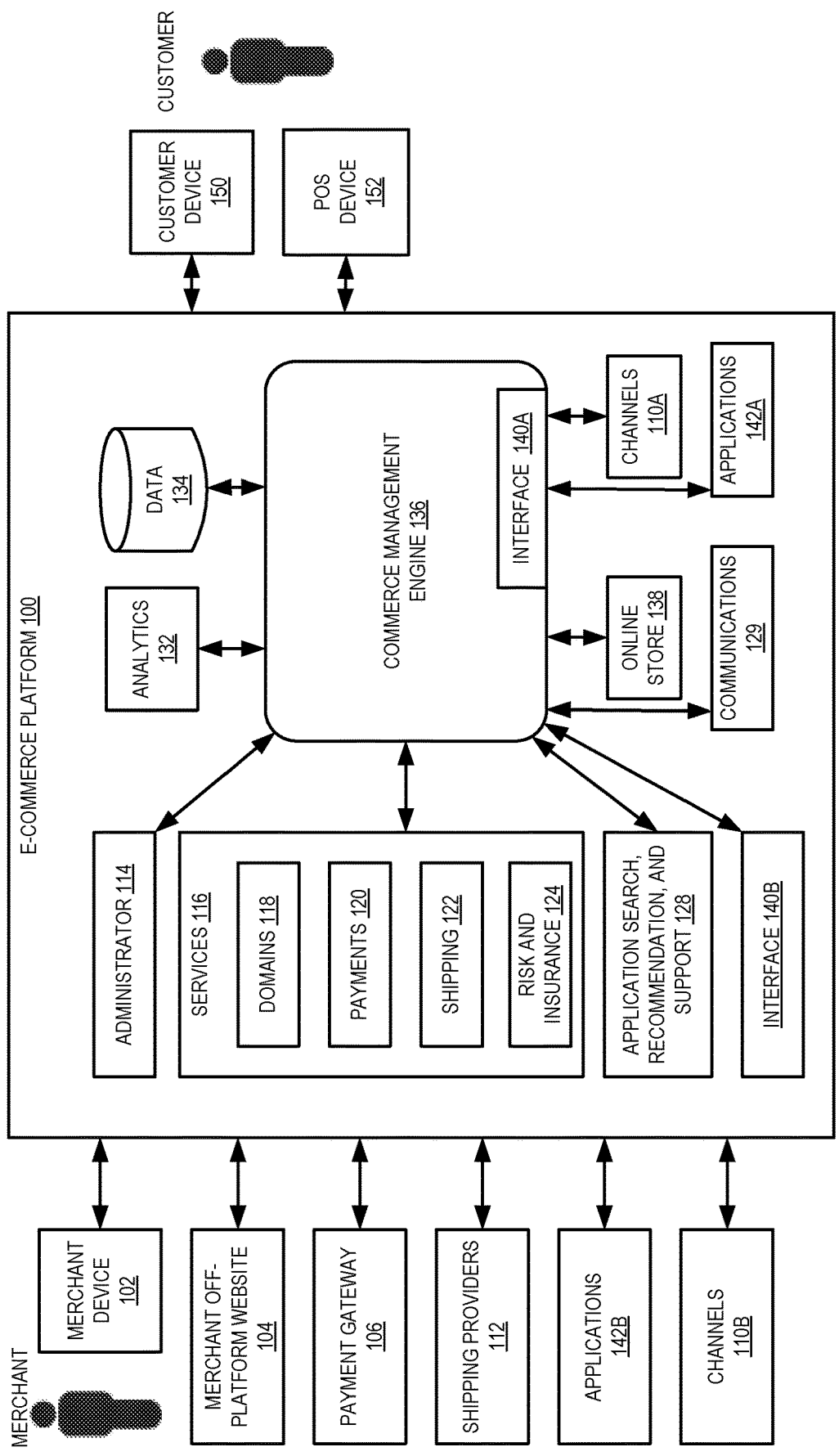
FIG. 1 shows an exemplary system in which the method of FIG. 2 may be, and sometimes is, implemented.

Methods and apparatus relating to the generation, management and use of taxonomies are described. Different aspects of the invention address one or more different issues relating to the generation and use of taxonomies.

Various features relate to a decision making process in which user interaction with a taxonomy is monitored. Users corresponding to one or more different groups are monitored as they use a taxonomy, e.g., an initial taxonomy. Over time statistics are collected based on the user interaction and the effectiveness of the taxonomy determined with respect to one or more groups of users.

In various embodiments the effectiveness of a taxonomy is based on the number of searches/clicks required before an item of interest has been found e.g. for clicks: how many products or pages of products within a taxonomy are browsed before finding an item of interest, how many child categories are browsed within a parent category, how many levels of a taxonomy are expanded. For text search's effectiveness can be and sometimes is based on how many searches are conducted "within a category" (e.g. using the dropdown in a top search bar provided by a merchant that allows a user to specify a particular category to search) and/or how many search queries contain taxonomy category terms. Effectiveness can also be measured or determined by recognizing particular patterns of searches and clicks, e.g. a user starts with a search query, then refines the results by a category or two using a presented taxonomy on the left hand sidebar, then adds more search terms. Level of customer interest can also be gauged e.g. the difference between a product that is: clicked on, clicked on and analyzed for a certain length of time, added to a cart, purchased and used as an indicator of taxonomy effectiveness.

In other embodiments effectiveness is determined based on the number of searches in relation to the number of sales of an item, e.g., a product, in the taxonomy, by which items, e.g. products, are often browsed or purchased together. A combination of these measures can be, and sometimes are, used potentially in combination with other signals or measures of effectiveness. The effectiveness of a taxonomy is determined with respect to a determined segmentation of users, and a decision whether to continue using an existing taxonomy or generate a new taxonomy for a group of users is made. When a decision to generate a new taxonomy is made a custom taxonomy for the group of users is generated and stored for future use.

Over time multiple custom taxonomies are generated for different user groups with each group of users being provided access to products through the taxonomy which provides the best results for the group and with new taxonomies being generated over time as needed to achieve a high level of effectiveness. The user groups may be based on geographic regions, company or service area to which the users are related, known user interests, previous purchase/transaction/commerce or browsing histories, devices used by the users and/or other factors which may be known and may correlate to the user's purpose for using the taxonomy or method of accessing the taxonomy to identify items of interest to the user. The users may, and sometimes do, order items identified through use of a taxonomy.

While user interaction metrics are used in some embodiments to trigger generation of a new, e.g., custom taxonomy, item listings are also monitored and the number of item listings in one or more categories can be, and sometimes is, used to trigger generation of a new, e.g., rebalanced, taxonomy. In at least some embodiments monitoring item listings includes monitoring the collection of products associated with, and/or categorized by, the taxonomy.

Thus in various embodiments the methods and apparatus provide not only for automated decision making with regard to when custom taxonomies should be generated for individual groups of users but also support automatic decisions as to when rebalancing of a taxonomy should be implemented due to a change in items listed whether that be due to the addition of new items or the removal of items from the listings.

Thus the system and methods support both customized taxonomy generation for different groups of users and self-balancing of taxonomies as the listed items change over time.

The methods and apparatus can be used to implement, monitor and update an initial taxonomy, e.g., one generated from scratch given an initial set of items to analyze, and/or can be employed to monitor one or more existing taxonomies as they are used and/or as items are added or removed to a taxonomy based listing of items.

In various embodiments in addition to deciding when to create a new taxonomy or modify an existing taxonomy, the methods can be used to determine when the number of taxonomies in use should be reduced, e.g., by replacing multiple similar taxonomies with a single common taxonomy.

As custom taxonomies are generated over time, the association between a particular user group or groups and a particular taxonomy is stored in memory. When a user attempts to access an item listing, the group to which the user corresponds is identified and the taxonomy corresponding to the identified user group is used to provide the user access to item listings or multiple taxonomies related to each segmentation based on a multi-category breakdown of that particular user's segmentation.

With the automated processes of managing taxonomies, different user groups can have different customized taxonomies generated over time based on user metrics indicating the effectiveness of a taxonomy while also taking into consideration the effect that changes in item listings may have on the need to reorganize, e.g., rebalance one or more taxonomies.

While various features have been discussed in the above summary it should be appreciated that all features need not be included in all embodiments. Numerous variations on the above described methods and apparatus will be discussed in the detail description which follows.

DETAILED DESCRIPTION

Methods and apparatus relating to the generation, management and use of taxonomies are described. The effective presentation of items or other objects to users, e.g., by generating, using and maintaining one or more taxonomies, is a technical problem that can have a significant impact on the usefulness of the system or application using the taxonomy.

Many embodiments and features of the methods and apparatus are particularly well suited for use as part of a user/customer interface of an E-commerce system. While various different aspects of the invention address one or more different issues relating to the generation and use of taxonomies, the aspects can be used alone or in combination and thus not all aspects need be included in each of the described embodiments.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may, and sometimes does, provide a centralized system for providing merchants with online resources and facilities for managing their business. The facilities described herein may be, and sometimes are, deployed in part or in whole through a machine that executes computer software, modules, program codes, and/or instructions on one or more processors which may be part of or external to the platform 100. Merchants may, and sometimes do, utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may, and sometimes does, utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be, and sometimes are, incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may, and sometimes does, represent a multitenant facility comprising a plurality of virtual storefronts. In embodiments, merchants may, and sometimes do, manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may, and sometimes does, sell across channels 110A-B and then manage their sales through the e-commerce platform 100, where channels 110A may be, and sometimes are, provided internal to the e-commerce platform 100 or from outside the e-commerce channel 110B. A merchant may, and sometimes does, sell in their physical retail store, at pop ups, through wholesale, over the phone, and the like, and then manage their sales through the e-commerce platform 100. A merchant may, and sometimes does, employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may, and sometimes does, refer to the multitenant collection of storefronts supported by the e-commerce platform 100 (e.g., for a plurality of merchants) or to an individual merchant's storefront (e.g., a merchant's online store).

In embodiments, a customer may, and sometimes does, interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may. and sometimes does, enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be, and sometimes is, implemented through a processing facility including a processor and a memory, the processing facility storing a set of instructions that, when executed, cause the e-commerce platform 100 to perform the e-commerce and support functions as described herein. The processing facility may be, and sometimes is, part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be, and sometimes is, implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be, and sometimes are, implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be, and sometimes is, served to a customer device 150 through a webpage provided by a server of the e-commerce platform 100. The server may, and sometimes does, receive a request for the webpage from a browser or other application installed on the customer device 150, where the browser (or other application) connects to the server through an IP Address, the IP address obtained by translating a domain name. In return, the server sends back the requested webpage. Webpages may be, and sometimes are, written in or include Hypertext Markup Language (HTML), template language, JavaScript, and the like, or any combination thereof. For instance, HTML is a computer language that describes static information for the webpage, such as the layout, format, and content of the webpage. Website designers and developers may, and sometimes do, use the template language to build webpages that combine static content, which is the same on multiple pages, and dynamic content, which changes from one page to the next. A template language may, and sometimes does, make it possible to re-use the static elements that define the layout of a webpage, while dynamically populating the page with data from an online store. The static elements may be, and sometimes are, written in HTML, and the dynamic elements written in the template language. The template language elements in a file may, and sometimes do, act as placeholders, such that the code in the file is compiled and sent to the customer device 150 and then the template language is replaced by data from the online store 138, such as when a theme is installed. The template and themes may, and sometimes do, consider tags, objects, and filters. The client device web browser (or other application) then renders the page accordingly.

In embodiments, online stores 138 may be, and sometimes are, served by the e-commerce platform 100 to customers, where customers can browse and purchase the various products available (e.g., add them to a cart, purchase immediately through a buy-button, and the like). An item, e.g., product, taxonomy is often used to support customer browsing of times so that they can be selected for purchase. Online stores 138 may be, and sometimes are, served to customers in a transparent fashion without customers necessarily being aware that it is being provided through the e-commerce platform 100 (rather than directly from the merchant). Merchants may, and sometimes do, use a merchant configurable domain name, a customizable HTML theme, and the like, to customize their online store 138. Merchants may, and sometimes do, customize the look and feel of their website through a theme system, such as where merchants can select and change the look and feel of their online store 138 by changing their theme while having the same underlying product and business data shown within the online store's product hierarchy. Themes may be, and sometimes are, further customized through a theme editor, a design interface that enables users to customize their website's design with flexibility. Themes may also be, and sometimes are, customized using theme-specific settings that change aspects, such as specific colors, fonts, and pre-built layout schemes. The online store may, and sometimes does, implement a content management system for website content. Merchants may, and sometimes do, author blog posts or static pages and publish them to their online store 138, such as through blogs, articles, and the like, as well as configure navigation menus. Merchants may, and sometimes do, upload images (e.g., for products), video, content, data, and the like to the e-commerce platform 100, such as for storage by the system (e.g. as data 134). In embodiments, the e-commerce platform 100 may, and sometimes do, provide functions for resizing images, associating an image with a product, adding and associating text with an image, adding an image for a new product variant, protecting images, and the like.

As described herein, the e-commerce platform 100 may, and sometimes does, provide merchants with transactional facilities for products through a number of different channels 110A-B, including the online store 138, over the telephone, as well as through physical POS devices 152 as described herein. The e-commerce platform 100 may, and sometimes does, include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be, and sometimes are, provided via the e-commerce platform 100 or in association with external facilities, such as through a payment gateway 106 for payment processing, shipping providers 112 for expediting the shipment of products, and the like.

In embodiments, the e-commerce platform 100 may, and sometimes does, provide for integrated shipping services 122 (e.g., through an e-commerce platform shipping facility or through a third-party shipping carrier), such as providing merchants with real-time updates, tracking, automatic rate calculation, bulk order preparation, label printing, and the like.

In embodiments, a merchant may, and sometimes does, log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be, and sometimes is, able to access the different sections of administrator 114 by using a sidebar. Sections of the administrator 114 may, and sometimes do, include various interfaces for accessing and managing core aspects of a merchant's business, including orders, products, customers, available reports and discounts. The administrator 114 may, and sometimes does, also include interfaces for managing sales channels for a store including the online store, mobile application(s) made available to customers for accessing the store (Mobile App), POS devices, and/or a buy button. The administrator 114 may, and sometimes does, also include interfaces for managing applications (Apps) installed on the merchant's account; settings applied to a merchant's online store 138 and account. A merchant may, and sometimes does, use a search bar to find products, pages, or other information. Depending on the device 102 or software application the merchant is using, they may be, and sometimes are, enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be, and sometimes is, viewed through acquisition reports or metrics, such as displaying a sales summary for the merchant's overall business, specific sales and engagement data for active sales channels, and the like. Reports may, and sometimes do include acquisition reports, behavior reports, customer reports, finance reports, marketing reports, sales reports, custom reports, and the like. The merchant may be, and sometimes is, able to view sales data for different channels 110A-B from different periods of time (e.g., days, weeks, months, and the like), such as by using drop-down menus. An overview dashboard may be, and sometimes is, provided for a merchant that wants a more detailed view of the store's sales and engagement data. An activity feed in the home metrics section may be, and sometimes is, provided to illustrate an overview of the activity on the merchant's account. For example, by clicking on a 'view all recent activity' dashboard button, the merchant may be able to see a longer feed of recent activity on their account. A home page may, and sometimes does, show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may, and sometimes does, provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may, and sometimes does, provide a financial facility 120 for secure financial transactions with customers, such as through a secure card server environment. The e-commerce platform 100 may, and sometimes does, store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may, and sometimes do, have Sarbanes-Oxley Act (SOX) compliance and a high level of diligence required in their development and operation. The financial facility 120 may, and sometimes does, also provide merchants with financial support, such as through the lending of capital (e.g., lending funds, cash advances, and the like) and provision of insurance. In addition, the e-commerce platform 100 may, and sometimes does, provide for a set of marketing and partner services and control the relationship between the e-commerce platform 100 and partners. They also may, and sometimes do, connect and onboard new merchants with the e-commerce platform 100. These services may, and sometimes do, enable merchant growth by making it easier for merchants to work across the e-commerce platform 100. Through these services, merchants may be, and sometimes are, provided help facilities via the e-commerce platform 100.

In embodiments, online store 138 may, and sometimes does, support a great number of independently administered storefronts and process a large volume of transactional data on a daily basis for a variety of products. Transactional data may, and sometimes does, include customer contact information, billing information, shipping information, information on products purchased, information on services rendered, and any other information associated with business through the e-commerce platform 100. In embodiments, the e-commerce platform 100 may, and sometimes does, store this data in a data facility 134. The transactional data may be, and sometimes is, processed to produce analytics 132, which in turn may be, and sometimes are, provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may, and sometimes does, store information about business and merchant transactions, and the data facility 134 may, and sometimes does, have many ways of enhancing, contributing, refining, and extracting data, where over time the collected data may, and sometimes does, enable improvements to aspects of the e-commerce platform 100.

Referring again to FIG. 1, in embodiments the e-commerce platform 100 may be, and sometimes is, configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be, and sometimes are, provided internal to the e-commerce platform 100 or applications 142B from outside the e-commerce platform 100. In embodiments, an application 142A may be, and sometimes is, provided by the same party providing the platform 100 or by a different party. In embodiments, an application 142B may be, and sometimes is, provided by the same party providing the platform 100 or by a different party. The commerce management engine 136 may be, and sometimes is, configured for flexibility and scalability through portioning (e.g., sharding) of functions and data, such as by customer identifier, order identifier, online store identifier, and the like. The commerce management engine 136 may accommodate store-specific business logic and in some embodiments, may, and sometimes does, incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may, and sometimes does, enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be, and sometimes are, provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be, and sometimes is, configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be, and sometimes is, preferred to move these components out of the commerce management engine 136 and into their own infrastructure within the e-commerce platform 100.

In embodiments, the e-commerce platform 100 may, and sometimes does, provide for a platform payment facility 120, which is another example of a component that utilizes data from the commerce management engine 136 but may be located outside so as to not violate the isolation principle. The platform payment facility 120 may, and sometimes does, allow customers interacting with online stores 138 to have their payment information stored safely by the commerce management engine 136 such that they only have to enter it once. When a customer visits a different online store 138, even if they've never been there before, the platform payment facility 120 may, and sometimes does, recall their information to enable a more rapid and correct check out. This may, and sometimes does, provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be, and sometimes is, retrievable from an online store's checkout, allowing information to be made available globally across online stores 138. It would be difficult and error prone for each online store 138 to be able to connect to any other online store 138 to retrieve the payment information stored there. As a result, the platform payment facility may be, and sometimes is, implemented external to the commerce management engine 136.

For those functions that are not included within the commerce management engine 136, applications 142A-B provide a way to add features to the e-commerce platform 100. Applications 142A-B may be, and sometimes are, able to access and modify data on a merchant's online store 138, perform tasks through the administrator 114, create new flows for a merchant through a user interface (e.g., that is surfaced through extensions API), and the like. Merchants may be, and sometimes are, enabled to discover and install applications 142A-B through application search, recommendations, and support 128. In embodiments, core products, core extension points, applications, and the administrator 114 may be, and sometimes are, developed to work together. For instance, application extension points may be built inside the administrator 114 so that core features may be extended by way of applications, which may deliver functionality to a merchant through the extension.

In embodiments, applications 142A-B may, and sometimes do, deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may, and sometimes do, support online stores 138 and channels 110A-B, provide for merchant support, integrate with other services, and the like. Where the commerce management engine 136 may provide the foundation of services to the online store 138, the applications 142A-B may, and sometimes do, provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be, and sometimes are, connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be, and sometimes are, integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be, and sometimes are, provided with a software development kit (SDK), such as through creating a frame within the administrator 114 that sandboxes an application interface. In embodiments, the administrator 114 may not have control over nor be aware of what happens within the frame. The SDK may be, and sometimes is, used in conjunction with a user interface kit to produce interfaces that mimic the look and feel of the e-commerce platform 100, such as acting as an extension of the commerce management engine 136.

Applications 142A-B that utilize APIs may, and sometimes do, pull data on demand, but often they also need to have data pushed when updates occur. Update events may be, and sometimes are, implemented in a subscription model, such as for example, customer creation, product changes, or order cancelation. Update events may, and sometimes do, provide merchants with needed updates with respect to a changed state of the commerce management engine 136, such as for synchronizing a local database, notifying an external integration partner, and the like. Update events may, and sometimes do, enable this functionality without having to poll the commerce management engine 136 all the time to check for updates, such as through an update event subscription. In embodiments, when a change related to an update event subscription occurs, the commerce management engine 136 may, and sometimes does, post a request, such as to a predefined callback URL. The body of this request may, and sometimes does, contain a new state of the object and a description of the action or event. Update event subscriptions may be, and sometimes are, created manually, in the administrator facility 114, or automatically (e.g., via the API 140A-B). In embodiments, update events may be queued and processed asynchronously from a state change that triggered them, which may, and sometimes does, produce an update event notification that is not distributed in real-time.

In embodiments, the e-commerce platform 100 may, and sometimes does, provide application search, recommendation and support 128. Application search, recommendation and support 128 may, and sometimes does, include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be, and sometimes are, utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may, and sometimes does, include base functions of the e-commerce platform 100 and expose these functions through APIs 140A-B to applications 142A-B. The APIs 140A-B may, and sometimes does, enable different types of applications built through application development. Applications 142A-B may be, and sometimes are, capable of satisfying a great variety of needs for merchants but may be, and sometimes are, grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may, and sometimes do, include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may, and sometimes do, include applications that provide useful integrations that participate in the running of a business, such as shipping providers 112 and payment gateways.

In embodiments, an application developer may, and sometimes does, use an application proxy to fetch data from an outside location and display it on the page of an online store 138. Content on these proxy pages may be, and sometimes is, dynamic, capable of being updated, and the like. Application proxies may be, and sometimes are, useful for displaying image galleries, statistics, custom forms, and other kinds of dynamic content. The core-application structure of the e-commerce platform 100 may, and sometimes does, allow for an increasing number of merchant experiences to be built in applications 142A-B so that the commerce management engine 136 can remain focused on the more commonly utilized business logic of commerce.

The E-commerce platform 100 provides an online shopping experience through a curated system architecture that enables merchants to connect with customers in a flexible and transparent manner. The system may, and often does, use an item taxonomy as part of the user interface used to present items to a customer. In some cases the taxonomy presented to the user may be a taxonomy corresponding to a group to which the particular user corresponds, e.g., with users corresponding to different geographic locations, companies, age groups, etc. being presented item listing via different taxonomies intended to facilitate user identification of items relevant to the user and/or group to which the user belongs. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be, and sometimes are, modeled as applications 142A-B (a possible exception being the online store 138, which is integrated within the commence management engine 136). A merchandising component may, and sometimes does, allow merchants to describe what they want to sell and where they sell it. The association between a product and a channel may be modeled as a product publication and accessed by channel applications, such as via a product listing API. A product may, and sometimes does, have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be, and sometimes are, grouped into collections, provided product identifiers (e.g., stock keeping unit (SKU)) and the like. Collections of products may be built by either manually categorizing products into one (e.g., a custom collection), by building rule sets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be, and sometimes is, composed of multiple cart line items, where each cart line item tracks the quantity for a product variant. Merchants may, and sometimes do, use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may, and sometimes does, implement a web checkout as a customer-facing order creation process. A checkout API may be, and sometimes is, provided as a computer-facing order creation process used by some channel applications to create orders on behalf of customers (e.g., for point of sale). Checkouts may be, and sometimes are, created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may, and sometimes do, calculate taxes and shipping costs based on the customer's shipping address. Checkout may, and sometimes do, delegate the calculation of taxes to a tax component and the calculation of shipping costs to a delivery component. A pricing component may, and sometimes does, enable merchants to create discount codes (e.g., 'secret' strings that when entered on the checkout apply new prices to the items in the checkout). Discounts may be, and sometimes are, used by merchants to attract customers and assess the performance of marketing campaigns. Discounts and other custom price systems may be, and sometimes are, implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be, and sometimes is, implemented within a payment processing component. The actual interactions with the payment gateways 106 may be provided through a card server environment. In embodiments, the payment gateway 106 may accept international payment, such as integrating with leading international credit card processors. The card server environment may, and sometimes does, include a card server application, card sink, hosted fields, and the like. This environment may, and sometimes does, act as the secure gatekeeper of the sensitive credit card information. In embodiments, most of the process may be, and sometimes is, orchestrated by a payment processing job. The commerce management engine 136 may, and sometimes does, support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may, and sometimes do, use an order API to create orders. Once an order is created, an order confirmation notification may be, and sometimes is, sent to the customer and an order placed notification sent to the merchant via a notification component. Inventory may be, and sometimes is, reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may, and sometimes does, record where variants are stocked, and tracks quantities for variants that have inventory tracking enabled. It may, and sometimes does, decouple product variants (a customer facing concept representing the template of a product listing) from inventory items (a merchant facing concept that represent an item whose quantity and location is managed). An inventory level component may, and sometimes does, keep track of quantities that are available for sale, committed to an order or incoming from an inventory transfer component (e.g., from a vendor).

The merchant may then review and fulfill (or cancel) the order. A review component may, and sometimes does, implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be, and sometimes are, persisted in an order risk model. Order risks may be, and sometimes are, generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be, and sometimes is, implemented by a fulfillment component. The fulfillment component may, and sometimes does, group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may, and sometimes does, send an email (e.g., a location that doesn't provide an API connection). An API fulfillment service may, and sometimes does, trigger a third party, where the third-party application creates a fulfillment record. A legacy fulfillment service may trigger a custom API call from the commerce management engine 136 to a third party (e.g., fulfillment by Amazon). A gift card fulfillment service may, and sometimes does, provision (e.g., generating a number) and activate a gift card. Merchants may, and sometimes do, use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may, and sometimes does, make the merchant aware of compliance issues with respect to legal obligations (e.g., with respect to taxes). In embodiments, the e-commerce platform 100 may, and sometimes does, enable merchants to keep track of changes to the contract of sales over time, such as implemented through a sales model component (e.g., an append-only date-based ledger that records sale-related events that happened to an item).

A taxonomy is a tree-like structure where each branch of the tree corresponds to a category, and typically each branch under a parent branch (i.e. a child branch) also adheres to the category of the parent branch. For example, two parent branches may be "Apparel" and "Electronics" and some child branches under "Apparel" may be "Tops", "Bottoms" and "Accessories", which each describe a type of apparel. Typically, the leaves of a taxonomy (i.e. the outermost categories in the tree) are categories that are associated directly with a collection of specific items, for example, a leaf could be "Sandals" (which belongs to "Apparel" →"Footwear") and one specific item could be "Keen's Women's Eco Sandals".

For taxonomies that are based on categorizing ever-changing items (e.g. new items being invented, new models of items being rolled out, old items/models discontinued), it's easy for the taxonomy to become out-of-date with reality—in other words, the initial set of categories is no longer effective for categorizing the newest set of items and/or includes leaves or branches for items which are no longer available.

Ineffective taxonomies give a poor user experience for browsing and discoverability of specific items within those categories. Consider, for example, if 10,000 items belong to "Sandals", it will be hard to browse them effectively, and may be time for new categories such as "Flip-flops", "Hiking sandals", "Walking sandals", and "Orthotic sandals" within the "Sandals" category (i.e. as children of a now parent node "Sandals"). Unfortunately the number of items in a category is not the only reason for a poor user experience.

Some items may be classified in multiple categories which can also lead to ineffective taxonomies if the general classifications are not cleaned up.

The user experience may depend, in part, on a user's expectations in terms of category names, item arrangement and/or particular interest. For example a user interested in a sandal from a fashion perspective may be interested in sandal arrangements based on available colors or styles. On the other hand users interested in sandals or other footwear, such as shoes, for functional reasons might prefer a very different taxonomy. Functional footwear users may prefer a taxonomy that reflects footwear features that group footwear based on features that provide comfort or protection. For example a taxonomy based on function might arrange footwear based on the type of shoe construction such as rubber soled footwear or footwear that includes the presence of a steel toe shield for protection.

The generation of a new taxonomy and its use in listing items may take time and resources in terms of computer processing power used to generate the new taxonomy. Accordingly, it can be desirable to use a taxonomy for an extended period of time.

In addition, the deployment of a new taxonomy can, for some users, have a negative impact rather than a positive one, since changes in a taxonomy might be beneficial to some users while making it harder for other users to find the items they are seeking e.g. one of the categories that a particular user tended to frequently use has now disappeared. While there are many ways to group users, it is often difficult to predict the best taxonomy that might be useful for a particular group at the time a taxonomy for a large item listing is put into use.

In view of the above it should be appreciated that there is a need for new and improved methods and apparatus relating to the generation and/or management of taxonomies used for item listings.

In particular it should be appreciated that it would be desirable if methods and/or apparatus could be developed that could address in an automated way the process of controlling when a new taxonomy structure should be generated, e.g., by revising an existing taxonomy or generating a new taxonomy from item listings and/or other information. In addition, it would be desirable if methods and/or apparatus could be developed which would allow various measurable factors to be taken into consideration when determining whether or not a new taxonomy is to be generated for users which would allow customized taxonomies to be generated for different groups of users, thereby providing efficient access to items based on needs and/or expectations of different user groups. While deciding when to modify or generate a new taxonomy is one problem that it would be desirable to address, when to reduce the number of taxonomies or combine taxonomies to limit the overall number of taxonomies in use is another aspect of taxonomy management which would be desirable to address.

It should be appreciated that a new system that addressed one, more or all of the above discussed taxonomy related problems would be desirable.

Figure 2A:
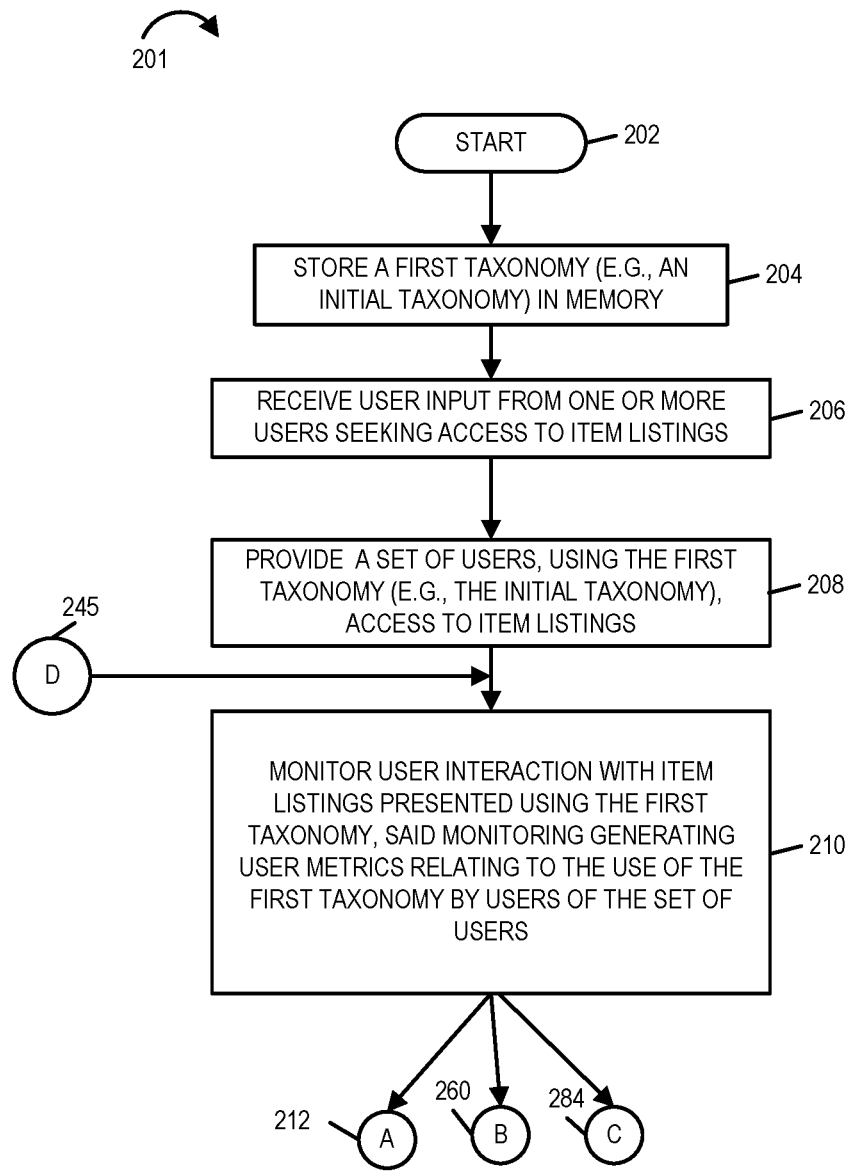
FIG. 2A is a first part of a flowchart illustrating the steps implemented in accordance with one exemplary embodiment of the invention.
Figure 2:
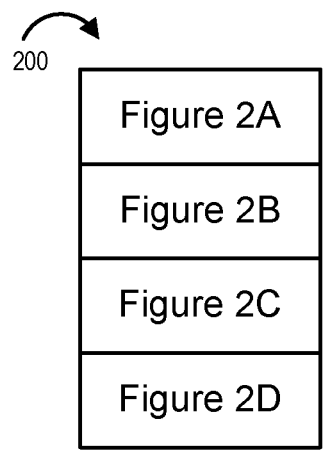
FIG. 2 shows how
Figure 3:
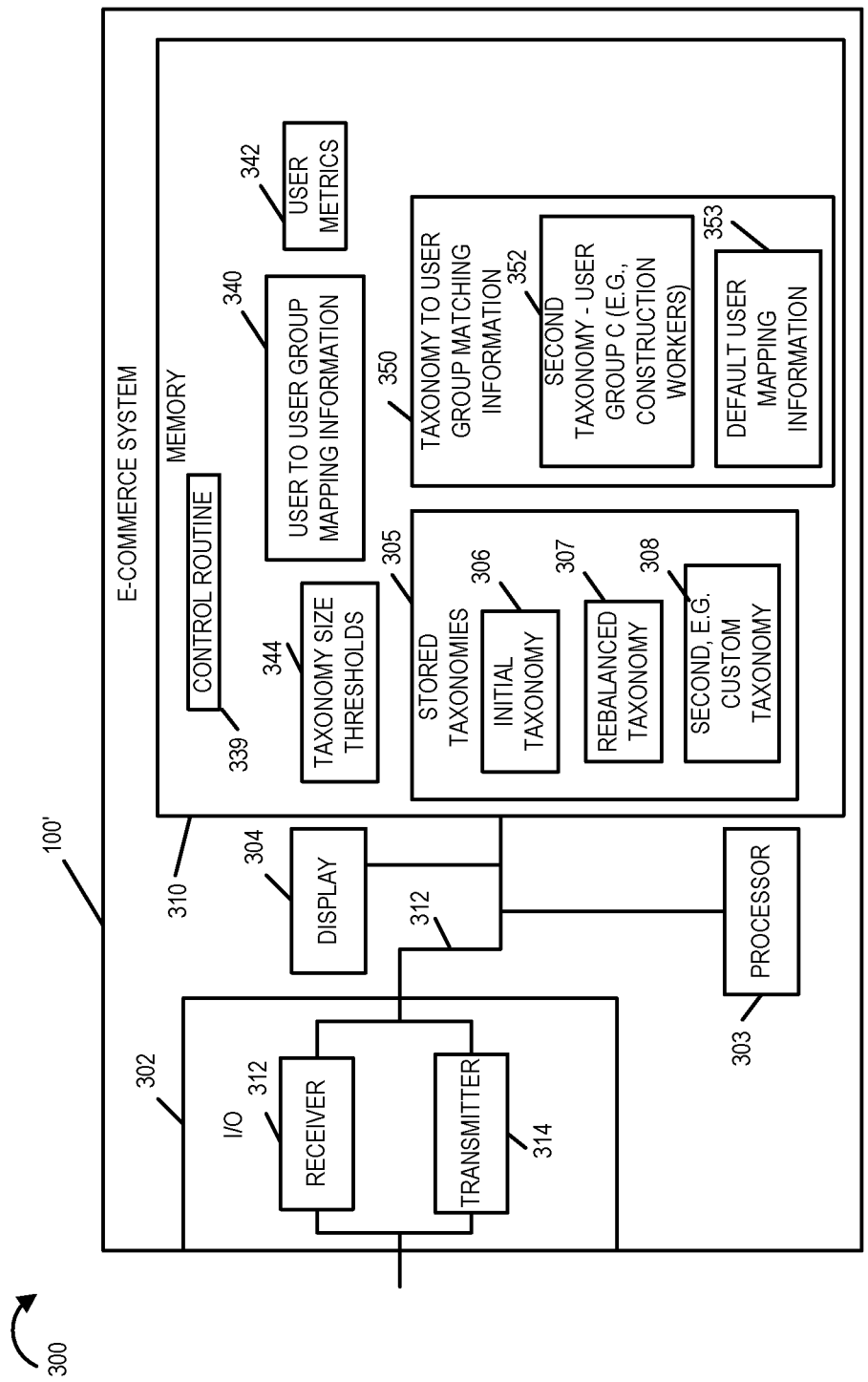
FIG. 3 shows an exemplary E-commerce system that can be used as the E-commerce platform of FIG. 1.

The exemplary method shown in FIG. 2 will be explained with reference to the exemplary E-commerce system 100'; shown in FIG. 3. Accordingly, FIG. 3 will now be discussed briefly to facilitate an understanding of the method shown in FIG. 2. In some implementation, the E-commerce system 100' may be or may employ the E-commerce system 100 of FIG. 1 in which case the E-commerce platform 100 may include the features shown in FIG. 3 in addition to any of the features shown in FIG. 1.

In the illustrated embodiment, the E-commerce platform 100' includes an input/output interface 302 that is coupled to a display 304, processor 303 and memory 310 by bus 312. The processor 303 is a hardware processor. The I/O interface 302 includes a receiver 312 and a transmitter 314. The receiver 312 and transmitter 314 are wired and/or wireless devices which are used for communicating to customer devices 150 and/or merchant systems. In some implementations the display 304 may be omitted.

A customer, e.g., user, device 150, is provided with access to item, e.g., product, listings, corresponding to one or more merchants. The item listings are provided using a taxonomy stored in the memory 310.

Memory 310 includes control routine 339 which, when executed by the processor 303, controls the system 100' to operate in accordance with the invention, e.g., to implement the steps of the method shown in FIG. 2 which will be discussed in detail below. Memory 310 also includes a set of taxonomy size thresholds 344, user to user group mapping information 340, user metrics 342, stored taxonomies 305 and taxonomy to user group matching information 350. The taxonomy size thresholds 344 include various threshold values, e.g., maximum number of listings under a node, etc., that are used to determine if a new taxonomy, e.g., a rebalanced taxonomy, should be generated. Size thresholds can also be about the taxonomy nodes themselves, not just the products beneath them. For example, the thresholds can relate to a number of nodes under a node (max threshold, min threshold) or the number of node levels under a node e.g. depth of categories)

User to user group mapping information 340 includes information which is used to determine what user group a user, e.g., customer, trying to access listing information corresponds to. Various kinds of user groups are supported, e.g., geographic based groups, demographic based groups, company related groups, etc. User metrics 342 include statistics relating to the use of taxonomies to access item listings and the group to which the statistics relate. The user metrics 342, as will be discussed below, can be, and sometimes are, used to automatically determine if a custom taxonomy should be generated for a user group.

In some embodiments the stored taxonomies 305 include an initial taxonomy 306, a rebalanced taxonomy 307 and a second, e.g., custom taxonomy 308. Taxonomy to user group matching information 350 in some embodiments includes second taxonomy to user group matching information 352 which indicates in the example that the second taxonomy corresponds to user group C, which in one example is a group of construction workers. In some cases this information indicates that the custom taxonomy 600 shown in FIG. 6 should be used when construction workers, a particular group of users, seek to access item listings. The taxonomy to user group mapping information 350 can, and sometimes does, also include default user group mapping information 353 indicating which of the stored taxonomies is to be used for users which do not correspond to a group for which there is a custom taxonomy.

An exemplary method will now be discussed with reference to FIGS. 2A through 2D.

FIGS. 2A through 2D illustrate the steps of an exemplary method in which one or more taxonomies are used and decisions are automatically made as to when a new taxonomy should be generated, an existing taxonomy revised, and/or a taxonomy deleted to reduce the number of different taxonomies in use. FIG. 2 is a diagram 200 showing how FIGS. 2A through 2D in combination form a complete flow chart showing the steps of the exemplary method.

The exemplary method will now be described beginning with a discussion of the steps 201 shown in FIG. 2A. The method begins in step 202, e.g., with the E-commerce platform 100 or 100' being powered on and the processor 303, beginning to implement the method under control of the control routine 339.

Operation proceeds from start step 202 to storage step 204. In step 204 a first taxonomy, e.g., an initial taxonomy 306, is stored in memory. The initial taxonomy 306 may be, and sometimes is, a taxonomy intended for a wide group of users. The initial taxonomy may have been generated without user feedback or results from user monitoring. The initial taxonomy, once stored, can be retrieved and used for presenting items to users, e.g., customers.

Operation proceeds from step 204 to step 206 in which user input is received from one or more users seeking access to item listings, e.g., listings of products available from one or more merchants via the E-commerce platform 100 or 100'. Then in step 208, a set of users is provided access to item listings using the first taxonomy. This may, and sometimes does, involve, e.g., communicating a portion of the taxonomy 424 and corresponding product listings to a customer device 150 for display on the display 404 of the device. The customer can then use the taxonomy to search for items and/or make selections of items displayed with or using the taxonomy. Multiple user devices can be supplied with the same or different portions of the taxonomy and corresponding item listings depending on their search requests and/or input.

In step 210 monitoring of user interaction with item listings presented using the first taxonomy is performed. The monitoring generates user metrics relating to the use of the first taxonomy by users included in the set of users which are provided access to items using the first taxonomy. The users in the first set of users can include users corresponding to multiple different groups, e.g., where the groups may, and sometimes do, correspond to different geographic regions, different age groups, different corporate groups and/or any other grouping by which users may be, and sometimes are, categorized. At the time of monitoring user identities and the group or groups to which individual monitored users belong is known in many cases. Such user to group mapping information 340 is stored in memory 310. User metrics 342 are generated from the monitoring performed in step 210. The user metrics 342 may be, and sometimes are, stored in memory 310.

Figure 2B:
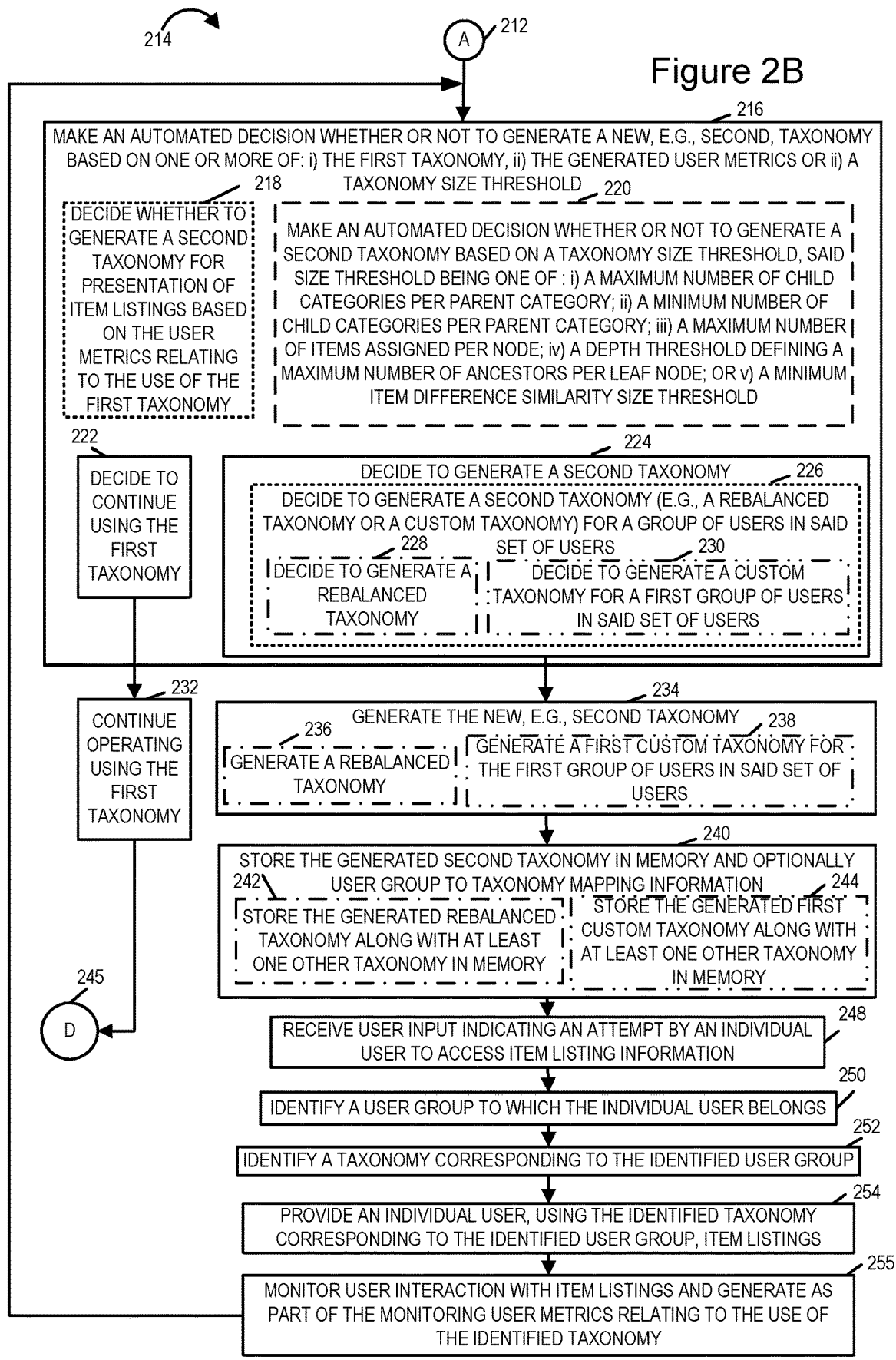
FIG. 2B is a second part of a flowchart illustrating the steps implemented in accordance with one exemplary embodiment of the invention.
Figure 2C:
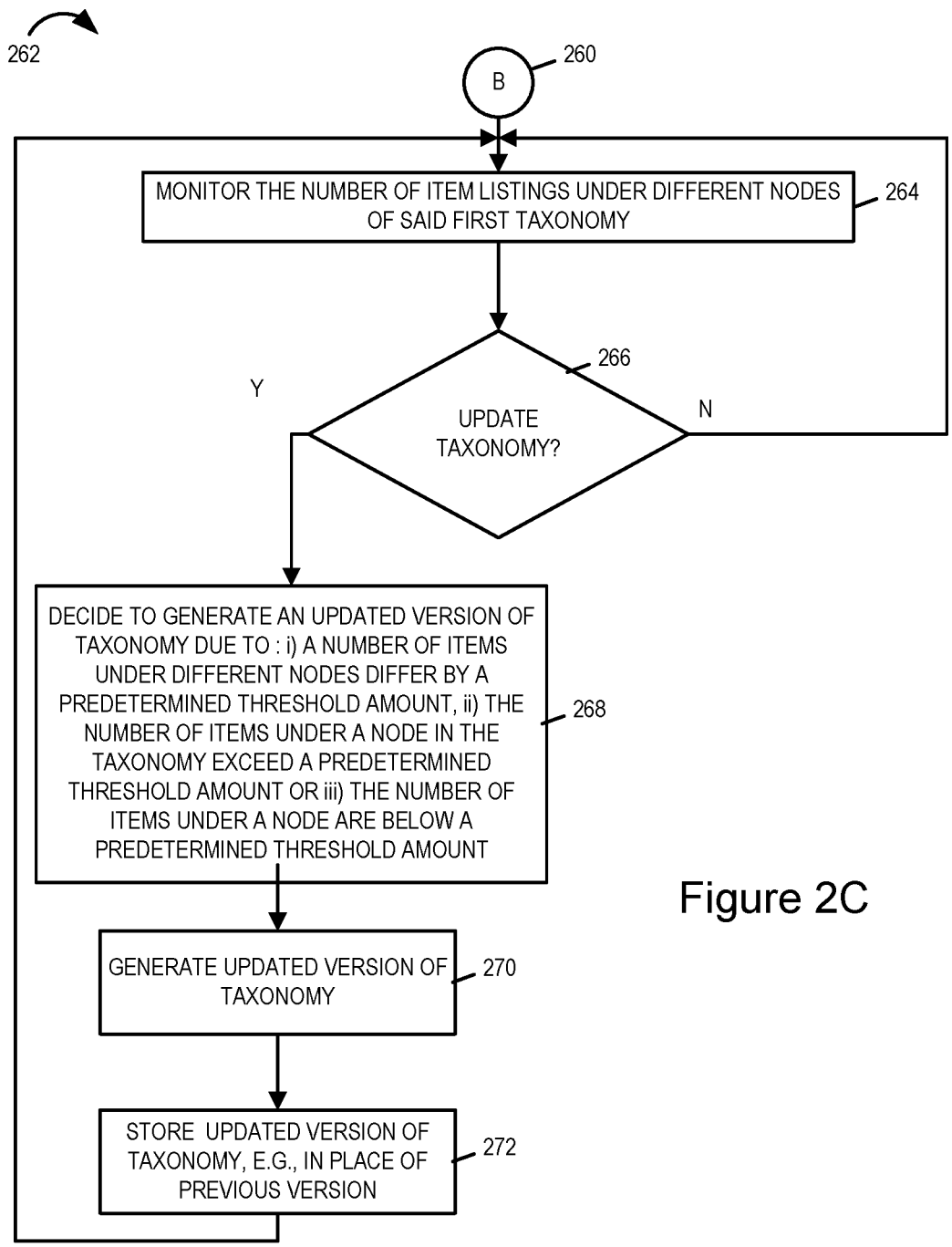
FIG. 2C is a third part of a flowchart illustrating the steps implemented in accordance with one exemplary embodiment of the invention.
Figure 2D:
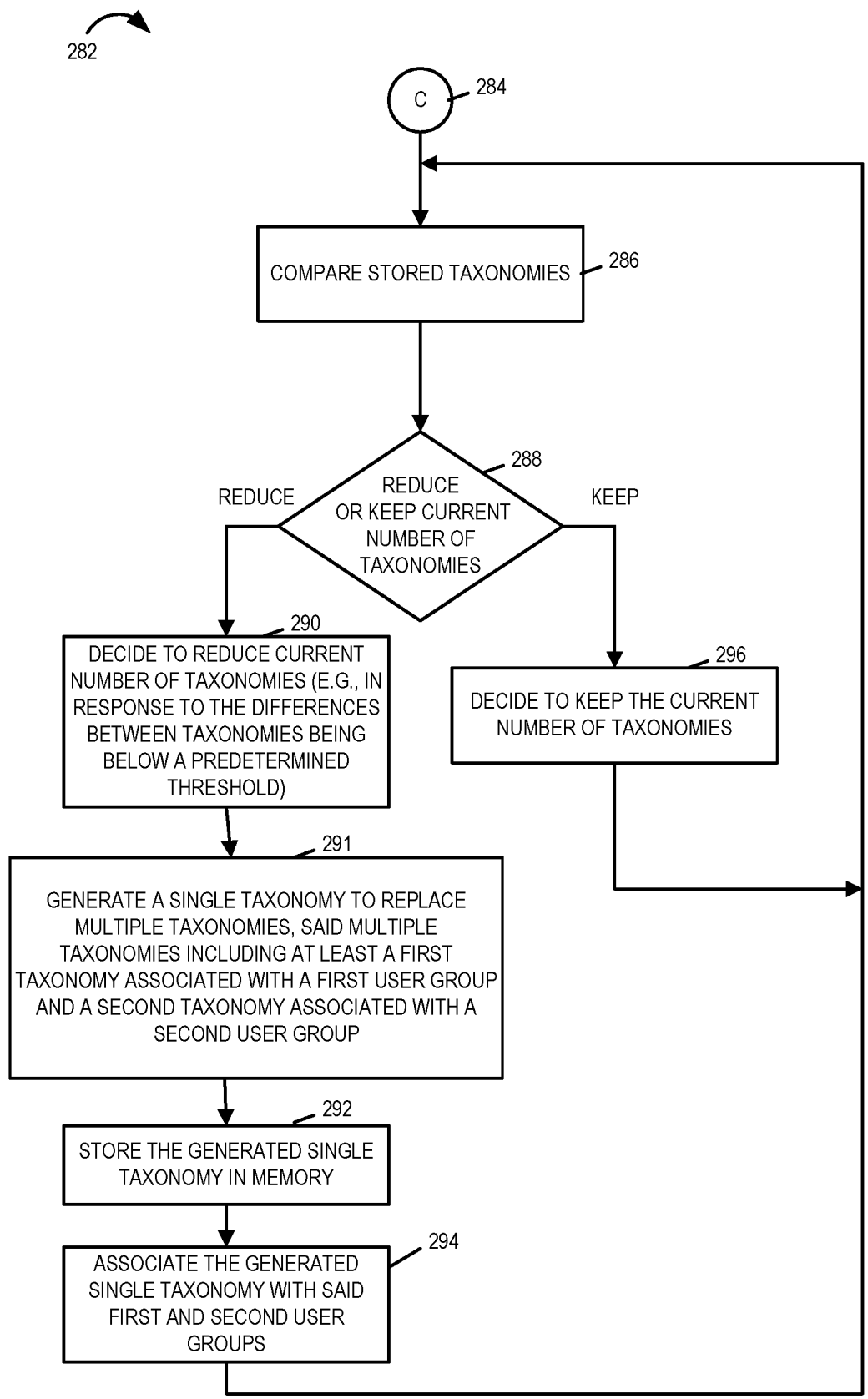
FIG. 2D is a fourth part of a flowchart illustrating the steps implemented in accordance with one exemplary embodiment of the invention.

Operation proceeds from step 210 in parallel via connecting nodes A 212, B 260 and C 284 to various subroutines 214, 262, 284 shown in FIGS. 2B, 2C and 2D. The subroutines 214, 262, 284 each perform taxonomy maintenance in that a new taxonomy may be generated in one or more of the subroutines and/or the number of taxonomies may be reduced depending on whether one or more conditions are satisfied. The subroutines 214, 262, 284 shown in FIGS. 2B, 2C and 2D, respectively, may and sometimes are implemented in parallel. The subroutines 214, 262, 284 may, and sometimes do, operate asynchronously.

Connecting node A 212 leads to the subroutine 214 shown in FIG. 2B. The subroutine 214 starts in step 216. In step 216 an automated decision is made whether or not to generate a new, e.g., a second taxonomy, based on one or more of i) the first taxonomy, ii) the generated user metrics, or iii) a taxonomy size threshold. In some embodiments step 216 includes one or more of steps 218, 220, 222 and 224. In step 218 the E-commerce system, e.g., processor 303 of E-commerce system 100 or 100', decides whether to generate a new, e.g., second, taxonomy for presentation of item listing based on the user metrics relating to the use of the first taxonomy. For example if it is taking a long time for a user to find one or more particular items, as indicated by item selection, a decision may be, and sometimes is, made to generate a second taxonomy. For example if it takes a long time for customers to find steel toed work boots, a decision may be made to make a new taxonomy with steel toed boots listed under a separate category from other boots. The second taxonomy may be generated for the particular group of users who had trouble easily finding and selecting the item, steel tipped work boots. For example the group of users may be construction workers or employees of one or more companies which require steel tipped boots for safety reasons.

While step 218 involves user metrics, decision step 220 involves making a decision based on features of the taxonomy being used, the first taxonomy, which can be independent of user metrics. Such features can, and sometimes do, relate to the number of levels or child categories, the number of items assigned to a particular node or category in the taxonomy, depth information or various other factors. Such factors can be indicative of how hard or how many clicks a user will have to make to traverse the taxonomy to find or reach a particular item and/or the number of items that are being grouped in a category. As should be appreciated if a user has to traverse a large number of levels to reach an item, the user may become frustrated and/or it may require more time than is desirable to reach a desired item. In contrast if too many items are included in a category a user may not be able to easily identify a particular item of interest even after having traversed the taxonomy to the correct level. Thus in some embodiments step 220 includes making an automated decision whether or not to generate a second taxonomy based on a taxonomy size threshold where the size threshold is one of i) a maximum number of child categories per parent category, ii) a minimum number of child categories per parent category, iii) a maximum number of items assigned per node, iv) a depth threshold defining a maximum number of ancestors per leaf node or v) a minimum item difference similarity size threshold. In step 220 one or more of the different types of thresholds can be checked and a determining that any of the size thresholds is exceeded will, in some embodiments, trigger generation of a new, e.g., second taxonomy, with categories and listings arranged so that the size thresholds are not exceeded by the generated second taxonomy even though the same items may be listed in the second taxonomy.

Memory 308 includes stored taxonomy size thresholds 344 which are, in some but not necessarily all embodiments, predetermined set size thresholds which are checked in step 220. Steps 218 and 220 may be considered optional in that one or both of the steps can be used or a determination can be made in another manner in step 216.

In some embodiments step 216 includes step 222 which involves deciding to continue using the first taxonomy, e.g., because neither step 218 nor step 220 resulted in a decision to generate a new, e.g., second, taxonomy. However, in some embodiments step 216 includes step 224 which is a decision to generate a second taxonomy, e.g., because a threshold considered in step 220 was exceeded or because a user metric, e.g., number of clicks or time to an item is added to a shopping cart from the start of a search was exceeded. Step 224 in some cases involves deciding to generate a second taxonomy for a group of users, e.g., a group in the set of users who were monitored. The decision may be a decision to generate a rebalanced taxonomy that is made in sub step 228 or a decision to generate a customer taxonomy for a first group of users which is made in sub step 230. The group of users for which the custom taxonomy is generated may be, and sometimes is, a group for which the user metrics indicate that the users were having trouble using the first taxonomy or taking longer than desired to find particular selected items. For example workers of a company trying to find steel tipped work boots may have a custom taxonomy generated for them which will be presented to users of the company in the future but not to other users.

If in step 216 a decision is made to continue using the first taxonomy, e.g., without generating a new taxonomy, operation proceeds to step 232. In step 232 the system 100 or 100' continues to use the first taxonomy with operation then proceeding to step D 245 which allows operation to continue, e.g., users to be provided to item listings using the first taxonomy with their use of the taxonomy then being monitored in step 210.

If in step 216 a decision was made to generate a new, e.g., second taxonomy, operation proceeds to step 234 in which the new, e.g., second, taxonomy is generated. In some embodiments step 234 includes step 236 in which a rebalanced taxonomy is generated, e.g., from the first taxonomy. Generating the rebalanced taxonomy includes, in some embodiments, moving items from one category to another or generating one or more new categories so that the number of items under each category is more uniform. In some cases in step 236 a category that previously had the largest number of items under it is modified to have fewer items under it.

In some embodiments, step 234 includes step 238. Step 238 includes generating a first custom taxonomy for a first group of users in the set of users that were using the first taxonomy. Consider for example where a group of users are construction workers. Creating the first custom taxonomy may involve generating one or more categories, represented by nodes in the taxonomy, intended to help the construction workers (first group of users) more easily find items of interest to them, e.g., steel toed work boots required by construction companies which employ the construction workers.

Figure 5:
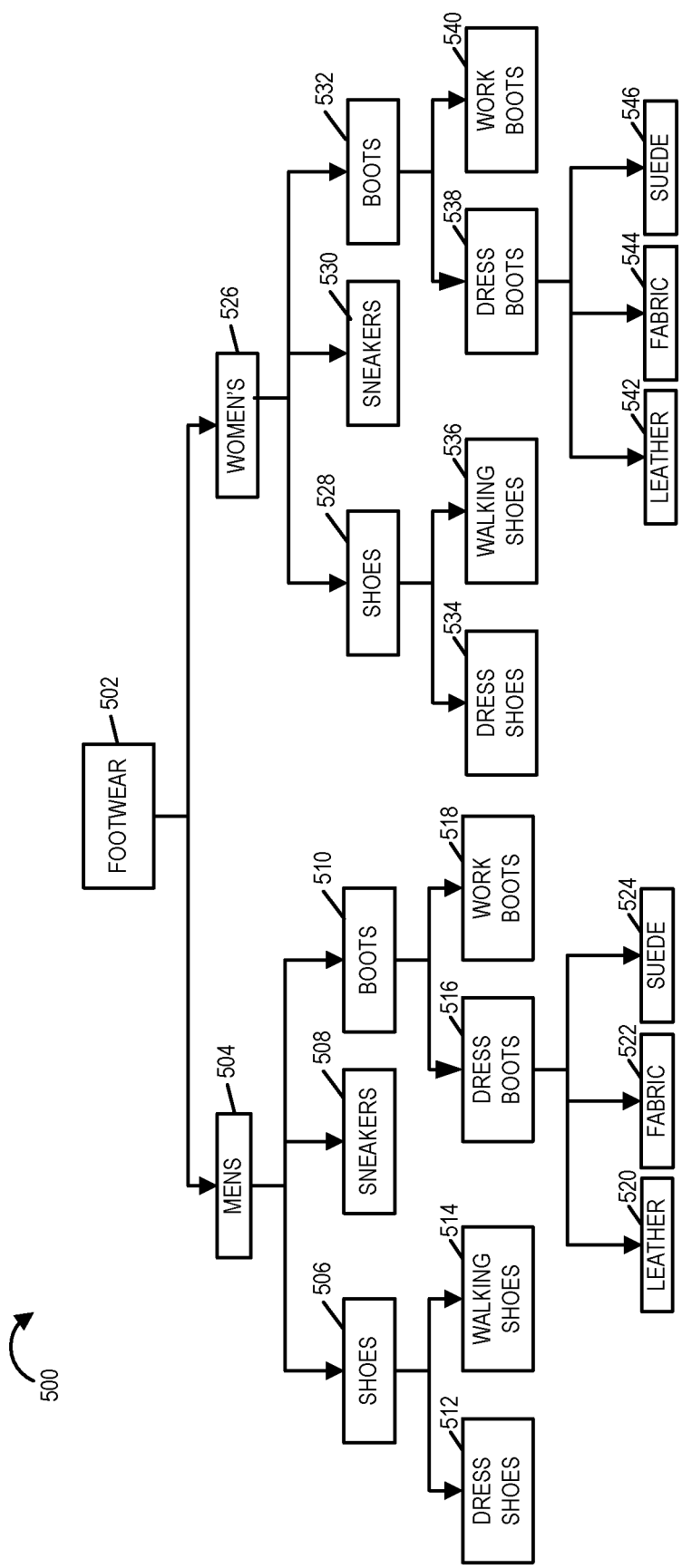
FIG. 5 shows an exemplary initial taxonomy that is used in some embodiments.
Figure 6:
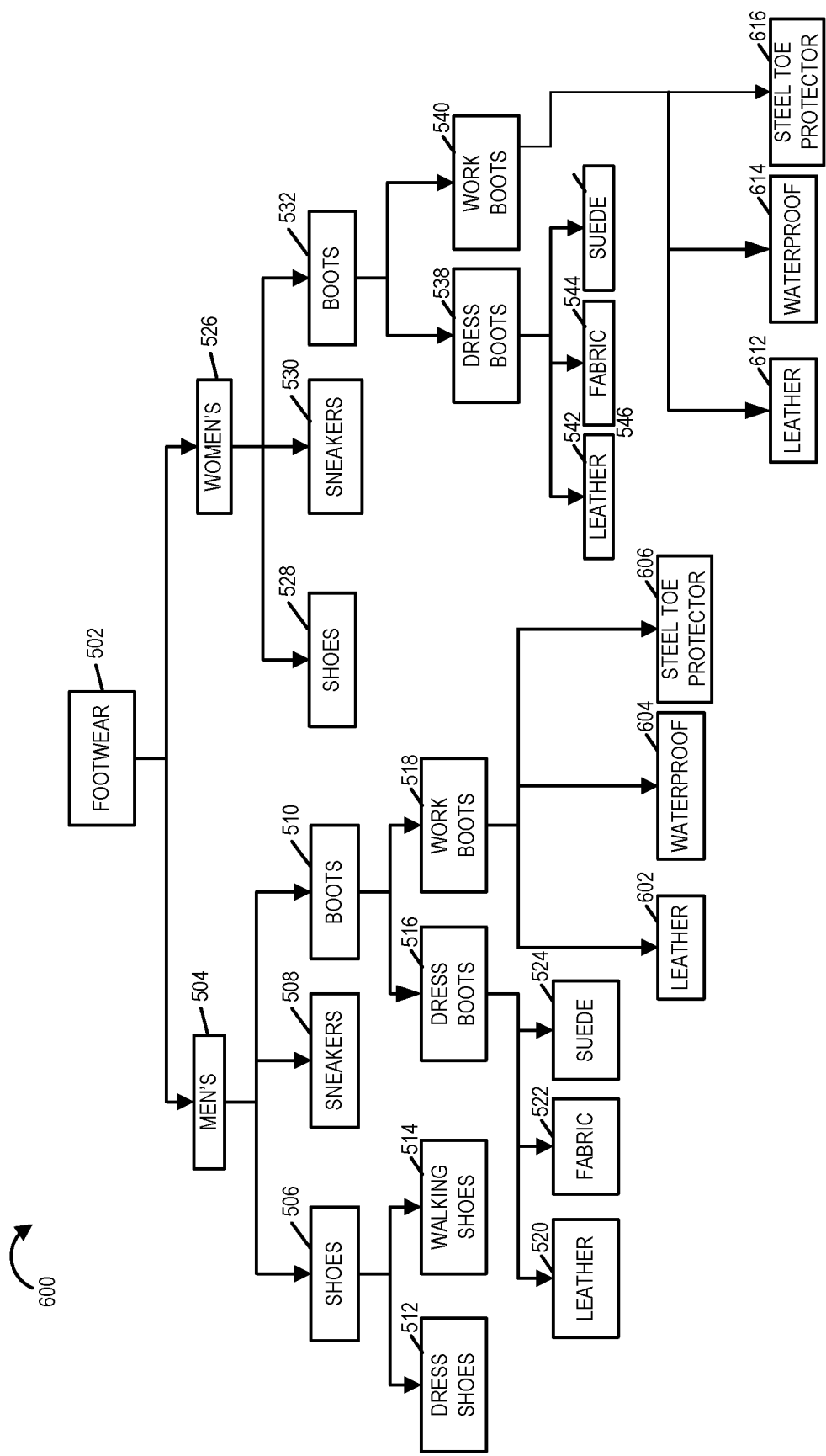
FIG. 6 shows a first custom taxonomy that can be generated from the initial taxonomy of FIG. 5 for a first set of users in accordance with the invention.

FIG. 6 shows an exemplary custom taxonomy generated from the first taxonomy 500 shown in FIG. 5. The exemplary custom taxonomy 600 for construction workers includes an added category 606 under the category "work boots" 518 for "steel toe protector" to help construction workers more easily find work boots with steel toe protection. This custom taxonomy 600 is used to present construction workers access to listed items once it is constructed while the first taxonomy 500 may be, and sometimes is, continued to be used for customers belonging to groups for which a custom taxonomy has not been created. In this way, in accordance with the method of the invention customized taxonomies tailored to the needs of particular user groups can be, and sometimes are, generated over time as user metrics relating to the different groups of users are collected, monitored and processed for use in taxonomy management decisions including deciding when to generate a new taxonomy.

With the new, e.g., second, taxonomy having been generated, operation proceeds to step 240 in which the generated, e.g., second, taxonomy is stored. Step 240 in some embodiments in which a rebalanced taxonomy is generated, includes step 242 in which the generated rebalanced taxonomy 307 is stored in memory 310, e.g., as part of a set 305 of stored taxonomies. In cases where a custom taxonomy is generated, storage step 240 includes step 244 in which the generated custom taxonomy is stored in memory 310, e.g., as a second taxonomy 308. Once stored the taxonomy generated in step 234 is available for use as is any other stored taxonomy. In addition to storing the generated taxonomy, storage step 240 also includes in some embodiments storage of taxonomy to user group matching information 350.

Operation proceeds from storage step 240 to step 248. In step 248 user input indicating an attempt by an individual user to access item listing information is received.

Operation proceeds from step 248 to step 250 in which a user group corresponding to the user who provided the user input received in step 248 is identified, e.g., based on the stored user to user group mapping information 340. Operation proceeds from step 250 to step 252 in which a taxonomy corresponding to the identified user group is identified, e.g., based on the stored taxonomy to user group matching information. In cases where a custom or other taxonomy for a user group to which the user belongs is not stored, the default, e.g., first taxonomy is identified as corresponding to the user group, e.g., default user group, to which the user belongs.

With the relevant taxonomy having been identified in step 252, it is used to provide the user access to item listing in step 254 with the user interaction with the item listings being monitored in step 255 to generate user metrics corresponding to the identified taxonomy which was used to provide item listings to the user. Operation proceeds from step 255 to step 216 where the generated user metrics are reviewed and used in making an automated decision as to whether or not a new taxonomy should be generated.

It should be appreciated from FIG. 2B that the method of the invention allows for a generic, e.g., initial taxonomy to be first used and then automatically processed to generate custom taxonomies for one or more user groups which are then provided with the custom taxonomy when interacting with product listings at future times. Given that the processes is automated, taxonomies for individual user groups can be, and sometimes are, automatically generated and refined to enhance user interaction by members of individual user groups with the product listings without the need for human intervention in many cases.

FIG. 2C shows a subroutine 262 which is implemented on an ongoing or periodic basis as part of managing the stored taxonomies such as the first taxonomy. The subroutine may be, and sometimes is, performed for each stored taxonomy to determine if it should be updated but will be explained in the context of processing of the first taxonomy. The subroutine 262 starts in step 264 which may be, and sometimes is, reached through connecting node B 260. In step 264 the number of item listings under different nodes of the taxonomy, e.g., first taxonomy, is checked, e.g., monitored. Then in step 266 a determination is made, based on the number of items under each node of the first taxonomy, as to whether the taxonomy should be updated.

If in step 266 it is determined that an update is not to be performed, operation proceeds back to step 264. However if an update is to be performed operation proceeds to step 268. The decision in step 264 to generate an updated version of the taxonomy is due to one or more of: i) a number of items under different nodes differing by a predetermined threshold amount; ii) the number of items under a node in the taxonomy exceeding a predetermined threshold number or iii) the number of items under the node being below a predetermined threshold amount.

Operation proceeds from step 268 to step 270 in which an updated version of the taxonomy, e.g., an updated version of the first taxonomy, is generated. Step 270 may be, and sometimes is, implemented in an automated manner with the processor 303 modifying the taxonomy being used so that the threshold which triggered step 268 is no longer violated, e.g., listings are reorganized so that the maximum number of listings under a node is no longer violated or another adjustment is made.

Once the updated taxonomy is generated in step 272 it is stored in memory. In some embodiments the updated taxonomy is stored in place of the taxonomy, e.g., first taxonomy, from which it was generated so that the next time the first taxonomy is accessed the updated version will be used. Operation proceeds from storage step 272 to monitoring step 264 in an ongoing process of managing the taxonomies being used.

FIG. 2D shows another exemplary taxonomy management subroutine 282. Subroutine 282, which begins in step 286, can be reached via connecting node C 284. Subroutine 282 deals with the possibility of a large number of similar taxonomies being generated, e.g., automatically over time, for different user groups. The generated taxonomies may be, and often are, based on the same initial taxonomy. The proliferation of taxonomies may present a management issue if the number of taxonomies with relatively small differences becomes too large. Subroutine 282 deals with this possibility by comparing taxonomies and potentially eliminating similar taxonomies, e.g., taxonomies which differ in a small way.

In step 286 the stored taxonomies, e.g., taxonomies included in memory portion 305, are compared. In step 288 a decision is made as to whether to reduce or keep the current number of taxonomies. If the difference between two or more stored taxonomies are small, e.g., with only a few items being listed or grouped differently, a decision is made to reduce the number of taxonomies, but otherwise a decision is made to keep the current number of taxonomies. If the decision in step 288 is to keep the current number of taxonomies the processing follows the path including step 296 in which the decision to keep the current number of taxonomies is affirmatively made and then processing returns to step 286 so that the taxonomies can be checked on a periodic or ongoing basis.

If however step 288 includes a decision to reduce the number of taxonomies, operation proceeds along the path including step 290 in which the decision to reduce the current number of taxonomies is affirmatively made. The decision to reduce the number of taxonomies is sometimes made based on a measurable difference between two or more taxonomies being below a set threshold.

Operation proceeds from step 290 to step 291 in which a single taxonomy is generated to replace multiple taxonomies, e.g., a first taxonomy corresponding to a first user group and a second taxonomy corresponding to a second user group. Generation of the single taxonomy may, and in some embodiments does, include taking into consideration the features of both taxonomies which are to be replaced and incorporating at least some of the features from each taxonomy that is to be replaced into the generated taxonomy. Thus the generated taxonomy may be, and sometimes is, more similar to either of the taxonomies being replaced than the taxonomies being replaced are to each other.

Once generated the taxonomy is stored in memory in step 292 and the taxonomies which are being replaced by the single generated taxonomy are deleted.

Operation proceeds from step 292 to step 294 in which the taxonomy to user group mapping information 350 is updated. The updated information maps the user groups which were previously mapped to the taxonomies that were replaced by the single generated taxonomy to the single generated taxonomy.

In this way multiple similar taxonomies can be replaced by a single taxonomy. Given that user metric information will continue to be collected and used to trigger generation of customer taxonomies as needed, if user interaction with the generated signal taxonomy is poor, a new custom taxonomy will be automatically generated. Thus the combination of automatic custom taxonomy generation and automatic merging or replacement of similar taxonomies with a single taxonomy will work together over time to limit the overall proliferation of custom taxonomies while also generating and maintaining custom taxonomies for various user groups which such custom taxonomies are beneficial to the user experience.

Operation proceeds from step 294 to step 286 so that the taxonomies can be checked on a periodic or ongoing basis.

Figure 4:
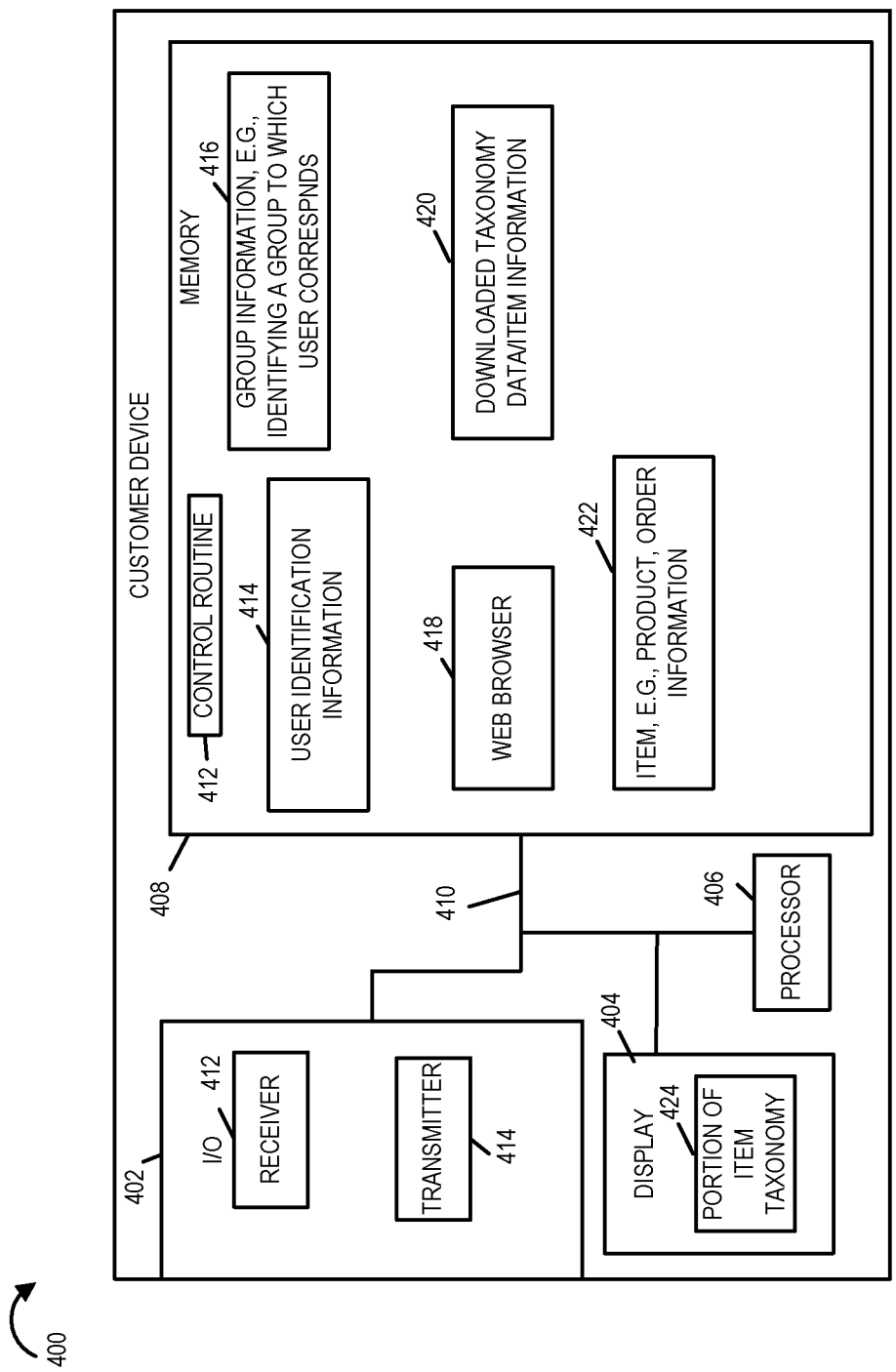
FIG. 4 shows an exemplary customer device which can be used in the system of FIG. 1.

FIG. 4 which illustrates an exemplary customer device 400 will now be discussed. The customer device 400 can be used as the customer device 150 of the system shown in FIG. 1. The customer device 400 includes an input/output interface 402. The interface 402 includes a receiver 412 and transmitter 414, which can be wired or wireless, that can be used to interact with the E-commerce platform 100 or 100' and can request and receive item (e.g., product) listing information from the E-commerce platform. The I/O interface 402 is coupled by a bus 410 to a display 404, processor 406 and memory 408. As illustrated in FIG. 4 the display 404 can and is sometimes used to display a portion 424 of an item taxonomy along with items that can be selected for purchase, e.g., by touching the display 404 in the case of a touch screen embodiment. The memory 408 includes a control routine 408 for controlling the customer device along with user identification information 414, web browser 418, user group information 416, downloaded taxonomy data and/or item information 420 and item information 422. The user identification information 414 is provided to the E-commerce platform 100 or 100' alone or in combination with user group information 416 thereby allowing the E-commerce platform 100 or 100' to identify the user and/or determine the user group to which the user of the customer device 400 corresponds. By providing user and/or user group information to the E-commerce platform 100 or 100' the customer device 400 supplies the E-commerce platform 100 or 100' with sufficient information that allows the platform to determine which taxonomy corresponds to the user of the customer device 400 and should be used for providing item listing information to the customer device 400 based on which individual is using the customer device 400.

FIG. 5 illustrates an exemplary initial taxonomy 500 used in some embodiments in which listed items are included under the broad category footwear represented by node 502. Under node 502 the taxonomy 500 includes categories for men's footwear 504 and women's footwear 526. The initial categories under men's and women's footwear are the same and include shoes 506, 528, sneakers 508, 530 and boots 532. Under shoes are included categories for dress shoes 512, 534 and walking shoes 514, 536. Under boots categories for dress boots 516, 538 and work boots 518, 540 are provided. In addition under dress boots 516, 538 categories are provided for leather boots 520, 542 fabric boots 522,544 and suede boots 524, 536. Under each of the leaf nodes in the taxonomy 500 are included individual items which are not shown in the FIG. 5 example.

The FIG. 5 taxonomy 500 may be used as a first or initial taxonomy. Over time user metrics are generated in accordance with the invention and a new taxonomy, e.g., a second taxonomy, may be generated taking in consideration the individual user metrics and the group or groups to which the collected metrics correspond. FIG. 6 shows a custom taxonomy 600 intended for users who are construction workers. Custom taxonomy 600 is generated in one embodiment when user metrics indicate that construction workers often look for boots based on characteristics including whether they are made of leather, are waterproof or include steel toe protection, but the search takes longer than desired to find such boots.

By adding categories of interest to construction workers, e.g., leather 602, 612, waterproof 604, 614 and steel toe protector 606, 616 to the initial taxonomy 500, the custom taxonomy for workers 600 is generated. This is done when user metrics indicate that users who correspond to a group identified as construction workers are taking longer than expected or more clicks then desired to select and/or purchase boots when the initial taxonomy 500 is used by the construction workers triggering an automatic generation of the custom taxonomy 600 for users who are construction workers.

Figure 7:
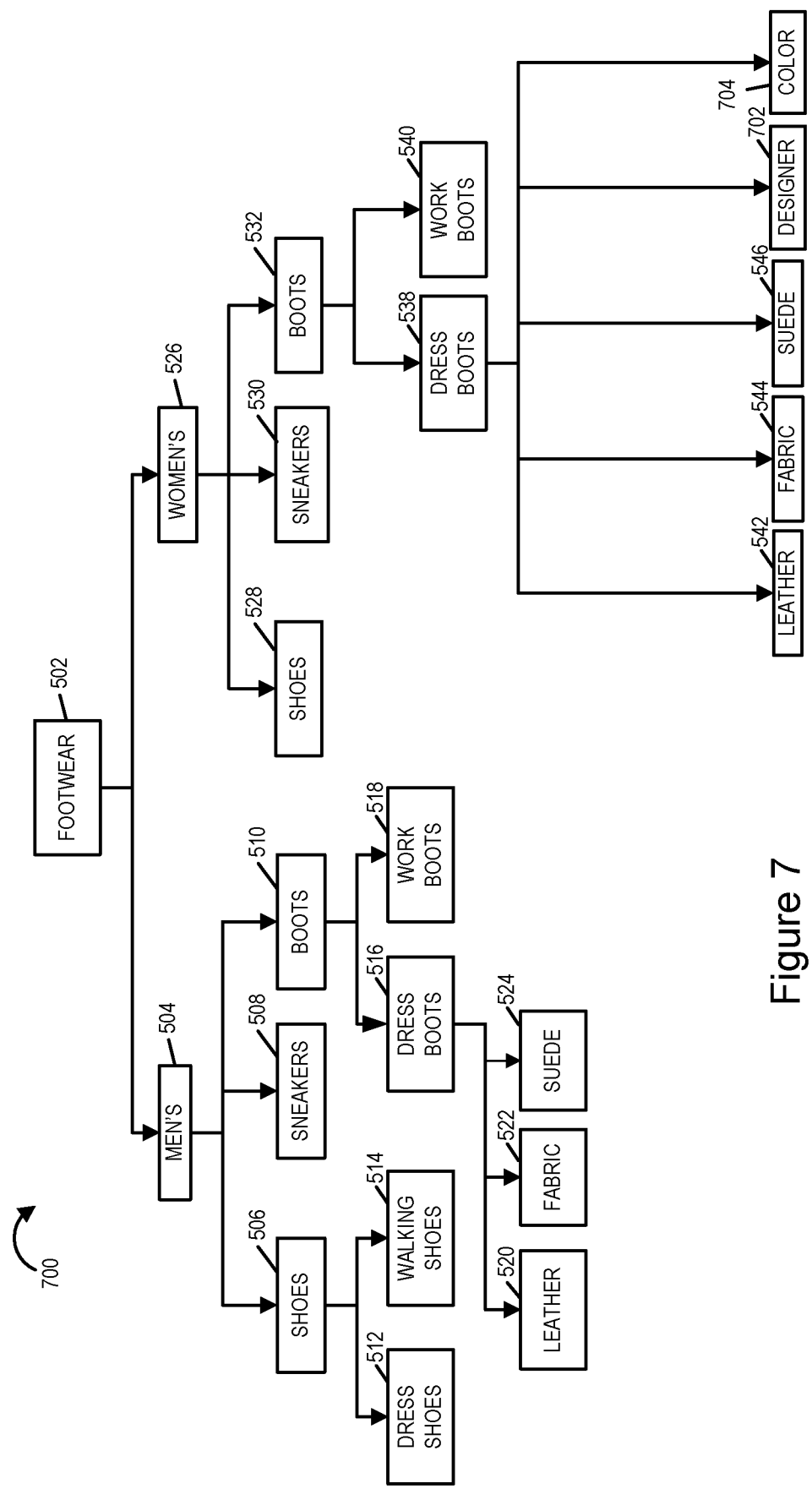
FIG. 7 shows a second custom taxonomy that can be generated from the initial taxonomy of FIG. 5 for a second set of users in accordance with the invention.

FIG. 7 illustrates an exemplary custom taxonomy 700, e.g., a taxonomy for women interested in fashion. The customized taxonomy 700 is similar to the initial taxonomy 500 but reflects the multiple categories relating to women's dress boots 538 with the categories including designer 702 and color 704 in addition to the other dress boot categories included in the initial taxonomy 500. By adding these categories designer 702, color 704, a customized taxonomy 700 is generated for women known to be interested in fashion footwear, based on the information obtained from the user metrics. The fact that the users correspond to such a group may be, and sometimes is, provided by the customer devices which may store information about a user belonging to a particular user group.

Various variations on the above described methods and apparatus are possible. Some additional exemplary embodiments and features will now be discussed to facilitate understanding of various features.

Assume that a leaf node in the tree hierarchy of the taxonomy represents one of the deepest-level category in that arm of the taxonomy (e.g. "Hiking Sandals"), rather than a particular item belonging to that category (e.g. "Women's Keen's Eco Sandals"). Items are therefore assigned to leaf categories in the hierarchy, although the system also allows for the possibility of a item being assigned to a parent category in the hierarchy if none of the leaf categories are appropriate (e.g. Crocs are neither a "Hiking Sandal" nor a "Flip-flop" and therefore only belong to the parent category "Sandals").

In some embodiments each item is assigned to a leaf of the taxonomy, representing the most likely (deepest) category that the item belongs to. As new items are added to the system, this assignment can be done automatically by determining the new item's similarity to each set of items belonging to taxonomy nodes, and assigning it to the one with the highest similarity. Additionally, the level of belonging of the item to each of the ancestor categories in a node's lineage (i.e. parent, grandparent, great-grandparent, etc) can also be used to determine a final similarity "score" for that node with that item. At each level of ancestor, the similarity can be calculated across all items assigned to any of the ancestor's descendants.

Item similarity can be, and sometimes is, measured using item characteristics, e.g. item title, item description, item tags, photos, customer reviews, user behavior associated with the item such as other items commonly browsed or purchased with the item, common search queries that are associated with the item.

Relevance of an item to a category can be and sometimes is measured by the similarity of the item to the other items in that category. Typically a comparative approach (e.g. similarity of item A to collection X vs. similarity of item A to collection Y) is better than a straightforward similarity threshold (e.g. similarity score must be >0.95), but both can be used (and even combined). The category of an item can also be confirmed against industry standards where they exist which could potentially be useful in the case of a tiebreaker between one or more categories.

In various embodiments the E-commerce platform 100 or 100' monitors the taxonomy and assigned items to determine desired adjustments, e.g. as new items are added, new sales are made, new items are browsed, etc.

The system 100 or 100', can automatically trigger, e.g., initiate, adjustments to the taxonomy when one or more of the following occur:
 certain size thresholds are reached, e.g. max/min number of child categories per parent category, max/min number of items assigned per node
 certain depth thresholds are reached, e.g. maximum number of ancestors per leaf node
 certain similarity thresholds are reached, e.g. low similarity among the collection of items assigned to a given category (cluster is too dispersed)
 a category has low sales or click-through rates relative to other similar-sized categories, or other sibling/adjacent categories on its items Adjustments to taxonomy categories can be and sometimes are accomplished by splitting one category into multiple categories. For example, if a max number of items in a category or a max depth/number of child categories per parent is reached, that category can be and sometimes is split. If a min number of items in a category or a min number of child categories per parent is reached, in some embodiments multiple categories, e.g., multiple child categories, are joined together. Reworking the entire taxonomy from scratch for a current set of existing items is also possible.

The system 100 or 110' can, and sometimes does automatically trigger adjustments to the item assignments to categories, for example:
 two or more items are frequently browsed comparatively together but aren't assigned to the same category, e.g. a baby blanket assigned to "Baby Sleep Accessories" and a fuzzy small-sized blanket assigned to "Blankets" which are often browsed in quick succession may be and sometimes are assigned to the same category
 an item that has low sales or click-through rates relative to other items in the category compared to its appearance in item results when the buyer is browsing by category may be and sometimes is automatically assigned to a different category.

An adjustment to the category assignment of an item is accomplished in some embodiments by simply reassigning the item to a new category.

For defining a taxonomy from scratch, an unsupervised machine learning process can be, and sometimes is used to define a taxonomy by dynamically creating different item categories. The system 100 or 100' identifies various characteristics that items have in common. These characteristics are then used to group the items into self-defined categories.

Random Forest algorithms are an example of an unsupervised ML system that could be, and sometimes are used for building a taxonomy in some embodiments. The system 200 or 100' in some embodiments ingests item characteristics, e.g. item title, item description, photos, customer reviews, user behavior associated with the item. These characteristics are then used to organize the item into categories. Random Forests are also used in some embodiments to organize items into a hierarchical structure, which many taxonomies leverage (however, for a flat taxonomy, a cluster analysis may be more suitable since there is no parent < >child relationships). Random Forests are flexible, allowing for custom configurations: control over depth, number of nodes (which translate to categories in our context), number of items in each category, or number of final categories (leaves).

An alternative approach to classification used in some embodiments involves the use of neural networks. This approach self-defines categories and organizes items into them, but provides less transparency on what characteristics and methods were used to determine the taxonomy.

Numbered List of Exemplary Method Embodiments

Method Embodiment 1 A computer-implemented method of listing items in a user accessible manner, the method comprising: providing (208) a set of users, using a first taxonomy, access to item listings; monitoring (210) user interaction with the item listings presented using the first taxonomy, said monitoring generating user metrics relating to use of the first taxonomy by users of the set of users; and making (216) an automated decision whether or not to generate a second (e.g. new) taxonomy based on one or more of i) the first taxonomy, ii) the generated user metrics, or iii) a taxonomy size threshold.

Method Embodiment 1A The computer-implemented method of Method Embodiment 1, further comprising: generating (234), when said automated decision is a decision to generate the second taxonomy, the second taxonomy; and storing (240) the second taxonomy in memory.

Method Embodiment 1B The computer-implemented method of Method Embodiment 1, further comprising: continuing (232) operation using the first taxonomy without generating a second taxonomy when the automated decision is a decision not to generate the second taxonomy.

Method Embodiment 2 The computer-implemented method of Method Embodiment 1, wherein making (216) an automated decision whether or not to generate a second taxonomy includes making (218) a decision whether to generate a second taxonomy for presentation of item listings based on the user metrics relating to use of the first taxonomy.

Method Embodiment 3 The computer-implemented method of Method Embodiment 2, wherein said metrics (e.g., statistics) include one, more or all of: sales per user per time unit, sales per user per access of item listing, click-through rates or a product selection indicator such as adding an item to a cart, wish list or comparison list.

Method Embodiment 4 The computer-implemented method of Method Embodiment 1, wherein said set of users includes users corresponding to different user groups; and wherein making (216) an automated decision based on the generated metrics includes making a decision to: i) continue using (222) the first taxonomy or ii) generate (226) a second taxonomy for a group of users in said set of users.

Method Embodiment 5 The computer-implemented method of Method Embodiment 4, wherein making (216) a decision to generate a second taxonomy further includes: making (230) a decision to generate a custom taxonomy for a first group of users in said set of users.

Method Embodiment 6 The computer-implemented method of Method Embodiment 5, further comprising: generating (238) a first custom taxonomy for the first group of users (e.g., from the first taxonomy potentially creating a new arrangement of levels or organization better suited to the needs of the first group of users); and storing (244) the first custom taxonomy along with at least one other taxonomy (e.g., the first taxonomy).

Method Embodiment 7 The computer-implemented method of Method Embodiment 6, further comprising: receiving (248) user input indicating an attempt by an individual user to access item listing information; identifying (250) a user group to which the individual user belongs (e.g., based on geographic region from which the access attempt is made, a known group (e.g., demographic group) or company with which the individual is associated, or device information associated with the individual user); identifying (252) a taxonomy corresponding to the identified user group; and providing (254) the individual user, using the identified taxonomy corresponding to the identified user group, item listings.

Method Embodiment 8 The computer-implemented method of Method Embodiment 1, wherein said step of making (216) an automated decision whether or not to generate a second taxonomy includes making (220) an automated decision whether or not to generate a second taxonomy based on a taxonomy size threshold; and said size threshold being one of: i) a maximum number of child categories per parent category; ii) a minimum number of child categories per parent category; iii) a maximum number of items assigned per node; iv) a minimum number of items assigned per node; iv) a depth threshold defining a maximum number of ancestors per leaf node (e.g., a number of nodes above a deepest leaf node); or v) a minimum item difference similarity size threshold (e.g. a minimum difference in terms of item similarity between items under different nodes being reached, e.g. a low similarity among a collection of items assigned to a given category and thus arranged under a particular node (which can be indicative of a cluster of items being too dispersed in the taxonomy for useful access)).

Method Embodiment 9 The computer-implemented method of Method Embodiment 8, further comprising: comparing (286) stored taxonomies; and deciding (290) to reduce the number of taxonomies when the differences between the taxonomies is below a predetermined threshold (e.g. the number of different nodes and/or levels in the taxonomy is below a threshold).

Method Embodiment 10 The computer-implemented method of Method Embodiment 9, further comprising: in response to deciding to reduce the number of taxonomies, generating (291) a single taxonomy to replace multiple taxonomies, said multiple taxonomies including at least a first taxonomy associated with a first user group and a second taxonomy associated with a second user group; storing (292) said single taxonomy in memory; and associating (294) said single taxonomy with said first and second user groups.

Numbered List of Exemplary System Embodiments

System Embodiment 1 A system (100 or 100') for providing users access to items listing items, the system (100 or 100') comprising: memory (310) including item listing information and information identifying users; and
a processor (303) configured control the system (100 or 100') to:
  provide (208) a set of users, using a first taxonomy, access to item listings;
  monitor (210) user interaction with the item listings presented using the first taxonomy, said monitoring generating user metrics relating to use of the first taxonomy by users of the set of users; and
  make (216) an automated decision whether or not to generate a second taxonomy based on one or more of i) the first taxonomy, ii) the generated user metrics, or iii) a taxonomy size threshold.

System Embodiment 1A The system (100 or 100') of System Embodiment 1, wherein the processor (303) is further configured to control the system (100 or 100') to:
  generate (234), when said automated decision is a decision to generate the second taxonomy, the second taxonomy; and
  store (240) the second taxonomy in memory (310).

System Embodiment 1B The system (100 or 100') of System Embodiment 1, wherein the processor (303) is further configured to control the system (100 or 100') to: continue (232) operation using the first taxonomy without generating a second taxonomy when the automated decision is a decision not to generate the second taxonomy.

System Embodiment 2 The system (100 or 100') of System Embodiment 1, wherein the processor (303) is configured to control the system (100 or 100'), as part of making (216) an automated decision whether or not to generate a second taxonomy to control the system to make (218) a decision whether to generate a second taxonomy for presentation of item listings based on the user metrics relating to use of the first taxonomy.

System Embodiment 3 The system (100 or 100') of System Embodiment 2, wherein said statistics include one, more or all of: sales per user per time unit, sales per user per access of item listing, click-through rates or a product selection indicator such as adding an item to a cart, wish list or comparison list.

System Embodiment 4 The system (100 or 100') of System Embodiment 1,
  wherein said set of users includes users corresponding to different user groups; and
  wherein the processor is configured, as part of making (216) an automated decision based on the generated metrics to:
    make a decision to: i) continue using (222) the first taxonomy or ii) generate (226) a second taxonomy for a group of users in said set of users.

System Embodiment 5 The system (100 or 100') of System Embodiment 4, wherein the processor (303) is configured, as part of making (216) a decision to generate a second taxonomy to: make (230) a decision to generate a custom taxonomy for a first group of users in said set of users.

System Embodiment 6 The system (100 or 100') of System Embodiment 5, wherein the processor (303) is further configured to:

generate (238) a first custom taxonomy for the first group of users (e.g., from the first taxonomy potentially creating a new arrangement of levels or organization better suited to the needs of the first group of users); and store (244) the first custom taxonomy along with at least one other taxonomy (e.g., the first taxonomy) in said memory.

System Embodiment 7 The system (100 or 100') of System Embodiment 6, wherein the processor (303) is further configured to control the system (100 or 100') to:

receive (248) user input indicating an attempt by an individual user to access item listing information;

identify (250) a user group to which the individual user belongs (e.g., based on geographic region from which the access attempt is made, a known group (e.g., demographic group) or company with which the individual is associated, or device information associated with the individual user);

identify (252) a taxonomy corresponding to the identified user group; and provide (266) the individual user, using the identified taxonomy corresponding to the identified user group, item listings.

System Embodiment 8 The system (100 or 100') of System Embodiment 1, where the processor (303) is further configured, to control the system (100 or 100'), as part of making (216) an automated decision whether or not to generate a second taxonomy to: make (220) an automated decision whether or not to generate a second taxonomy based on a taxonomy size threshold; and wherein said size threshold being one of: i) a maximum number of child categories per parent category; ii) a minimum number of child categories per parent category; iii) a maximum number of items assigned per node; iv) a minimum number of items assigned per node; iv) a depth threshold defining a maximum number of ancestors per leaf node (e.g., a number of nodes above a deepest leaf node); or v) a minimum item difference similarity size threshold (e.g. a minimum difference in terms of item similarity between items under different nodes being reached, e.g. a low similarity among a collection of items assigned to a given category and thus arranged under a particular node (which can be indicative of a cluster of items being too dispersed in the taxonomy for useful access)).

System Embodiment 9 The system (100 or 100') of System Embodiment 8, wherein the processor (303) is further configured to:

compare (286) stored taxonomies; and decide (290) to reduce the number of taxonomies when the differences between the taxonomies is below a predetermined threshold (e.g. the number of different nodes and/or levels in the taxonomy is below a threshold).

System Embodiment 10 The system (100 or 100') of System Embodiment 9, wherein the processor (303) is further configured to control the system (100 or 100') to generate (291), in response to deciding to reduce the number of taxonomies, a single taxonomy to replace multiple taxonomies, said multiple taxonomies including at least a first taxonomy associated with a first user group and a second taxonomy associated with a second user group;

store (292) said single taxonomy in memory; and associate (294) said single taxonomy with said first and second user groups.

Numbered List of Exemplary Non-Transitory Computer Readable Medium Embodiments

Non-Transitory Computer Readable Medium Embodiment 1 A non-transitory computer readable medium (310) including processor executable instructions which, when executed by a processor (303) cause the processor (303) to control a system (100 or 100') to:

provide (208) a set of users, using a first taxonomy, access to item listings;

monitor (210) user interaction with the item listings presented using the first taxonomy, said monitoring generating user metrics relating to use of the first taxonomy by users of the set of users; and make (216) an automated decision whether or not to generate a second taxonomy based on one or more of i) the first taxonomy, ii) the generated user metrics, or iii) a taxonomy size threshold.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed:

1. A computer-implemented method of listing items in a user accessible manner, the method comprising:
   providing, by a processor, for display on a set of electronic devices accessed by a set of users, using a first taxonomy, item listings;
   monitoring, by the processor, user interactions with the item listings presented on the set of electronic devices using the first taxonomy to measure effectiveness of the first taxonomy based on a number of searches and/or browsing operations required to locate items of interest using the first taxonomy by users of the set of users;
   generating, by the processor based on the monitored interactions, user metrics indicating the effectiveness of the first taxonomy for users of the set of users;
   automatically generating, by the processor, a second taxonomy for at least one group of users within the set of users based on the first taxonomy and the generated user metrics; and
   providing, by the processor, for display a revised item listing using the second taxonomy instead of the first taxonomy upon a request by any user within the at least one group of users to access the item listing.

2. The computer-implemented method of claim 1, wherein said user metrics include one, more or all of: sales per user per time unit, sales per user per access of item listing, click-through rates, or a product selection.

3. The computer-implemented method of claim 1, further comprising:
   generating, by the processor, a first custom taxonomy for a first group of users; and
   storing, by the processor, the first custom taxonomy along with at least one other taxonomy.

4. The computer-implemented method of claim 3, further comprising:
   receiving, by the processor, user input indicating an attempt by an individual user to access item listing information;
   identifying, by the processor, a user group to which the individual user belongs;
   identifying, by the processor, a taxonomy corresponding to the identified user group; and
   providing, by the processor, the individual user, using the identified taxonomy corresponding to the identified user group, item listings.

5. The computer-implemented method of claim 1, wherein automatically generating the second taxonomy is based on a taxonomy size threshold; and
   said size threshold being one of: a maximum number of child categories per parent category; a minimum number of child categories per parent category; a maximum number of items assigned per node; a minimum number of items assigned per node; a depth threshold defining a maximum number of ancestors per leaf node; or a minimum item difference similarity size threshold.

6. The computer-implemented method of claim 5, further comprising:
   comparing, by the processor, stored taxonomies; and deciding, by the processor, to reduce the number of taxonomies when the differences between the taxonomies is below a predetermined threshold.

7. The computer-implemented method of claim 6, further comprising:
in response to deciding to reduce the number of taxonomies, generating, by the processor, a single taxonomy to replace multiple taxonomies, said multiple taxonomies including at least a first taxonomy associated with a first user group and a second taxonomy associated with a second user group;
storing, by the processor, said single taxonomy in memory; and
associating, by the processor, said single taxonomy with said first and second user groups.

8. The computer-implemented method of claim 1, wherein the user metrics indicate an effectiveness of the first taxonomy.

9. The computer-implemented method of claim 8, wherein the effectiveness of the first taxonomy corresponds to a number of searches or clicks required before an item of interest is displayed.

10. A system for providing users access to items listing items, the system comprising:
memory including item listing information and information identifying users;
a processor configured control the system to:
provide for display on a set of electronic devices accessed by a set of users, using a first taxonomy, access to item listings;
monitor user interactions with the item listings presented on the set of electronic devices using the first taxonomy to measure effectiveness of the first taxonomy based on a number of searches and/or browsing operations required to locate items of interest using the first taxonomy by users of the set of users;
generate, based on the monitored interactions, user metrics indicating the effectiveness of the first taxonomy for users of the set of users;
automatically generate a second taxonomy for at least one group of users within the set of users based on the first taxonomy and the generated user metrics; and
provide, for display, a revised item listing using the second taxonomy instead of the first taxonomy upon a request by any user within the at least one group of users to access the item listing.

11. The system of claim 10, wherein said user metrics include one, more or all of: sales per user per time unit, sales per user per access of item listing, click-through rates or a product selection indicator such as adding an item to a cart, wish list or comparison list.

12. The system of claim 10, wherein the processor is further configured to:
generate a first custom taxonomy for a first group of users; and
store the first custom taxonomy along with at least one other taxonomy in said memory.

13. The system of claim 12, wherein the processor is further configured to control the system to:
receive user input indicating an attempt by an individual user to access item listing information;
identify a user group to which the individual user;
identify a taxonomy corresponding to the identified user group; and
provide the individual user, using the identified taxonomy corresponding to the identified user group, item listings.

14. The system of claim 10, wherein automatically generating the second taxonomy is based on a taxonomy size threshold; and wherein said size threshold being one of: a maximum number of child categories per parent category; a minimum number of child categories per parent category; a maximum number of items assigned per node; a minimum number of items assigned per node; a depth threshold defining a maximum number of ancestors per leaf node; or a minimum item difference similarity size threshold.

15. The system of claim 14, wherein the processor is further configured to:
compare stored taxonomies; and
decide to reduce the number of taxonomies when the differences between the taxonomies is below a predetermined threshold.

16. The system of claim 10, wherein the user metrics indicate an effectiveness of the first taxonomy.

17. The system of claim 16, wherein the effectiveness of the first taxonomy corresponds to a number of searches or clicks required before an item of interest is displayed.

18. A non-transitory computer readable medium including processor executable instructions which, when executed by a processor cause the processor to control a system to:
provide for display on a set of electronic devices accessed by a set of users, using a first taxonomy, access to item listings;
monitor user interactions with the item listings presented on the set of electronic devices using the first taxonomy to measure effectiveness of the first taxonomy based on a number of searches and/or browsing operations required to locate items of interest using the first taxonomy by users of the set of users;
generate, based on the monitored interactions, user metrics indicating the effectiveness of the first taxonomy for users of the set of users;
automatically generate a second taxonomy for at least one group of users within the set of users based on the first taxonomy and the generated user metrics; and
provide, for display, a revised item listing using the second taxonomy instead of the first taxonomy upon a request by any user within the at least one group of users to access the item listing.

19. The computer readable medium of claim 18, wherein said user metrics include one, more or all of: sales per user per time unit, sales per user per access of item listing, click-through rates, or a product selection indicator.

20. The computer readable medium of claim 18, wherein the user metrics indicate an effectiveness of the first taxonomy.

* * * * *